(12) United States Patent
Fujimaki et al.

(10) Patent No.: US 10,121,409 B2
(45) Date of Patent: Nov. 6, 2018

(54) DISPLAY DEVICE, METHOD OF CONTROLLING DISPLAY DEVICE, AND PROGRAM

(71) Applicant: SEIKO EPSON CORPORATION, Tokyo (JP)

(72) Inventors: Yutaka Fujimaki, Matsumoto (JP); Yuichi Kunitomo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 59 days.

(21) Appl. No.: 15/369,418

(22) Filed: Dec. 5, 2016

(65) Prior Publication Data

US 2017/0178565 A1 Jun. 22, 2017

(30) Foreign Application Priority Data

Dec. 21, 2015 (JP) .................................. 2015-248143

(51) Int. Cl.
| | | |
|---|---|---|
| *G09G 3/00* | (2006.01) | |
| *G09G 3/3208* | (2016.01) | |
| *G09G 3/20* | (2006.01) | |
| *G06F 3/147* | (2006.01) | |
| *G09G 3/34* | (2006.01) | |

(52) U.S. Cl.
CPC ........... *G09G 3/3208* (2013.01); *G09G 3/003* (2013.01); *G09G 3/2003* (2013.01); *G06F 3/147* (2013.01); *G09G 3/3406* (2013.01); *G09G 2320/0247* (2013.01); *G09G 2320/0276* (2013.01); *G09G 2320/041* (2013.01); *G09G 2320/0626* (2013.01); *G09G 2340/0428* (2013.01)

(58) Field of Classification Search
CPC ... G09G 2320/0626; G09G 2320/0276; G09G 3/2003; G09G 2320/041; G09G 3/3208; G09G 2320/0247
See application file for complete search history.

(56) References Cited

U.S. PATENT DOCUMENTS

| | | | |
|---|---|---|---|
| 2007/0177239 A1 | 8/2007 | Tanijiri et al. | |
| 2012/0007969 A1* | 1/2012 | Lin | G09G 3/003 348/56 |
| 2014/0266989 A1* | 9/2014 | Takahashi | G02B 27/01 345/8 |
| 2014/0292811 A1* | 10/2014 | Takayama | G06T 19/006 345/633 |
| 2015/0145896 A1* | 5/2015 | Kim | H04N 13/0497 345/690 |

FOREIGN PATENT DOCUMENTS

JP    2008-099222 A    4/2008

* cited by examiner

*Primary Examiner* — Muhammad N Edun
(74) *Attorney, Agent, or Firm* — Oliff PLC

(57) ABSTRACT

An HMD worn by a user to use includes a right display unit and a left display unit, an image display section for making a right eye of the user visually recognize an image based on light emitted by the right display unit and making a left eye of the user visually recognize an image based on light emitted by the left display unit, temperature sensors for detecting respective temperatures of the right display unit and the left display unit, and a control section for controlling the luminance of at least either one of the light display unit and the left display unit based on the temperatures detected by the temperature sensors.

15 Claims, 10 Drawing Sheets

DISPLAY DEVICE, METHOD OF CONTROLLING DISPLAY DEVICE, AND PROGRAM

BACKGROUND

1. Technical Field

The present invention relates to a display device, a method for controlling a display device, and a program.

2. Related Art

In the past, there has been known a small-sized display device worn by a user to use. Most of display devices have a light source, a light emitting part, or the like for emitting light, and the heat generated by the light source or the light emitting part due to the operation thereof has caused a problem in some cases. Specifically, there has been a possibility that the temperature of the light source or the light emitting part rises while using the display device to exceed the temperature range in which an appropriate operation can be achieved. Therefore, there have been proposed a variety of heating countermeasures of the display device provided with the light source or the light emitting part (see, e.g., JP-A-2008-99222 (Document 1)). Document 1 discloses a head-mounted display (HMD) used in the state of being mounted on the head of a user. The HMD is provided with a configuration of efficiently absorbing and transferring the heat generated by the light source using a flexible circuit board, and thus achieves avoidance of the problem caused by the heating of the light source with this configuration.

In the case of efficiently conducting and then radiating the heat generated by the light source due to the devise of the mechanical structure as in the device described in Document 1, the shape or the configuration of the display device is restricted. Therefore, there has been desired the heating countermeasure with less restrictions on the structure in the display device provided with the light source or the light emitting part.

SUMMARY

An advantage of some aspects of the invention is that, in a display device which generates light to make an image be visually recognized, the operation temperature can be kept in an appropriate range in accordance with the rise in temperature due to the light emission.

A display device according to an aspect of the invention is a display device worn by a user to use, and including a first picture element and a second picture element each generating picture a display section adapted to make a right eye of the user visually recognize an image based on the picture light generated by the first picture element, and make a left eye of the user visually recognize an image based on the picture light generated by the second picture element, a temperature detection section adapted to detect temperature of each of the first picture element and the second picture element, and a control section adapted to control luminance of the picture light generated by at least either one of the first picture element and the second picture element based on the temperature detected by the temperature detection section.

According to this aspect of the invention, by controlling the luminance of the light generated by the picture element in accordance with the change in temperature of the picture element, the operation temperature of the picture element can be kept within an appropriate range.

In another aspect of the invention, in the display device described above, the control section performs control of conforming the luminance of the picture light generated by the first picture element and the luminance of the picture light generated by the second picture element to lower one of the luminance of the picture light generated by the first picture element and the luminance of the picture light generated by the second picture element based on the temperatures of the first picture element and the second picture element.

According to this aspect of the invention, since the luminance of the picture light generated by the first picture element and the second picture element is conformed to the lower luminance, the luminance can be controlled in accordance with the rise in temperature of the picture element without extremely changing the visibility of the display image. Thus, it is possible to keep the operation temperature of the picture element within an appropriate range.

In another aspect of the invention, in the display device described above, the control section performs control of conforming the luminance of the picture light generated by the first picture element and the luminance of the picture light generated by the second picture element to lower one of the luminance of the picture light generated by the first picture element and the luminance of the picture light generated by the second picture element in a case in which either one of the temperatures of the first picture element and the second picture element becomes one of equal to and higher than a threshold value.

According to this aspect of the invention, it is possible to decrease the luminance of the picture light generated by the picture element in accordance with rise in temperature of either one of the first picture element and the second picture element without extremely changing the visibility of the display image to thereby keep the operation temperature of the picture element within an appropriate range.

In another aspect of the invention, in the display device described above, the control section performs control of conforming the luminance of the picture light generated by the first picture element and the luminance of the picture light generated by the second picture element to luminance corresponding to illuminance of outside light of the display section based on the temperatures of the first picture element and the second picture element.

According to this aspect of the invention, by controlling the luminance of the picture light generated by the first picture element and the second picture element in accordance with the brightness of the environmental light of the display device, it is possible to control the luminance without extremely lowering the visibility of the display image.

In another aspect of the invention, in the display device described above, the display section has a configuration of making the user visually recognize the image based on the picture light generated by the first picture element and the image based on the picture light generated by the second picture element, and transmitting an outside scenery to make the user visually recognize the outside scenery, and the control section performs control of conforming the luminance of the picture light generated by the first picture element and the luminance of the picture light generated by the second picture element to the luminance corresponding to the illuminance of the outside light transmitted through the display section.

According to this ape the invention, in the configuration in which the user visually recognizes the outside light transmitted through the display section and the picture light generated by the first picture element and the second picture element in a superimposed manner, the luminance of the picture light generated by the first picture element and the second picture element is controlled in accordance with the illuminance of the outside light. Thus, it is possible to control the luminance of the picture light generated by the first picture element and the second picture element while ensuring the visibility of both of the outside scenery visually recognized using the outside light and the display image.

In another aspect of the invention, in the display device described above, the display section is provided with an optical section adapted to guide the picture light generated by the first picture element to the right eye of the user and guide the picture light generated by the second picture element to the left eye of the user.

According to this aspect of the invention, the luminance can be controlled in accordance with the rise in temperature of the picture element while keeping an appropriate balance in the luminance between the images visually recognized by the right eye and left eye of the user.

In another of the invention, in the display device described above, the first picture element and the second pictures element are respectively located on sides of a head of the user.

According to this aspect of the invention, it is possible to control the luminance in accordance with rise temperature of the picture elements located on the sides of the head of the user to thereby keep the operation temperature of the picture elements within an appropriate range.

In another aspect of the invention, in the display device described above, the control section performs control of decreasing the luminance of the picture light generated by at least either one of the first picture element and the second picture element in a case in which at least either one of the temperatures of the first picture element and the second picture element becomes one of equal to and higher than a threshold value determined based on an influence on a body of the user.

According to this aspect the invention, it is possible to control the luminance of the picture element before the temperature of the picture elements located on the sides of the head of the user becomes the temperature at which the influence on the body of the user is concerned to thereby cope with the rise in temperature of the picture elements.

In another aspect of the invention, in the display device described above, the first picture element and the second picture element are each provided with a panel on which a light emitting member is mounted, and the temperature detection section is disposed on a back side of the light emitting member so as to have contact with the panel.

According to this aspect of the invention, the rise in temperature of the picture elements due to the emission of light can accurately be detected.

In another aspect of the invention, in the display device described above, the first picture element and the second picture element are each provided with the panel adapted to output image light including a plurality of colored light beams and a drive section adapted to drive the panel, and the temperature detection section is mounted on the drive section to detect temperature of the panel.

According to this aspect of the invention, the display device provided with the panel, the drive section, and the temperature detection section can be realized with a compact configuration.

In another aspect of the invention, in the display device described above, there is further included a storage section adapted to store a correction parameter used to correct a gamma value of the image light emitted by the panel for each temperature value of the panel, and the control section controls the luminance of the picture light generated by least either one of the first picture element and the second picture element based on the temperature detected by the temperature detection section, and performs gamma correction of the panel using correction parameter corresponding to the temperature detected by the temperature detection section.

According to this aspect of the invention, by correcting the color of the light emitted by the panels, the quality of the display image can be kept in a high level.

In another aspect the invention, in the display device described above, the first picture element and the second picture element are each provided with a light source section, a modulation device adapted to modulate light emitted by the light source section to output image light including a plurality of colored light beams, and a modulation device drive section adapted to drive the modulation device, and the temperature detection section is mounted together with the modulation device drive section.

According to this aspect of the invention, in the configuration in which the light emitted by the light source section is modulated by the modulation device to output the image light, the change in temperature of the light source and the modulation device can accurately be detected.

A method of controlling a display device according to still another aspect of the invention includes provide the display device worn by a user to use and including a first picture element and a second picture element each generating picture light, and a display section adapted make a right eye of the user visually recognize an image based on the picture light generated by the first picture element, and make a left eye of the user visually recognize an image based on the picture light generated by the second picture element, detecting temperature of each of the first picture element and the second picture element, and controlling luminance of the picture light generated by at least either one of the first picture element and the second picture element based on the temperature detected.

According to this aspect of the invention, by controlling the luminance of the picture light generated by the picture element in accordance with the change in temperature of the picture element, the operation temperature of the picture element can be kept within an appropriate range.

A program according to yet another aspect of the invention is executable by a computer adapted to control a display device worn by a user to use and including a first picture element and a second picture element each generating picture light, and a display section adapted to make a right eye of the user visually recognize an image based on the picture light generated by the first picture element, and make a left eye of the user visually recognize an image based on the picture light generated by the second picture element, the program including the steps of detecting temperature of each of the first picture element and the second picture element, and controlling luminance of the picture light generated by at least either one of the first picture element and the second picture element based on the temperature detected.

According to this aspect of the invention, by controlling the luminance of the picture light generated by the picture element in accordance with the change in temperature of the picture element, the operation temperature of the picture element can be kept within an appropriate range.

The invention can be put into practice in a variety forms of other than the display device, the method of controlling the display device, and the program described above. For example, the invention can be implemented as a recording medium storing the program described above, a server for delivering the program, a transmission medium for transmitting the program described above, and a data signal including the computer program described above and embodied in a carrier wave.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
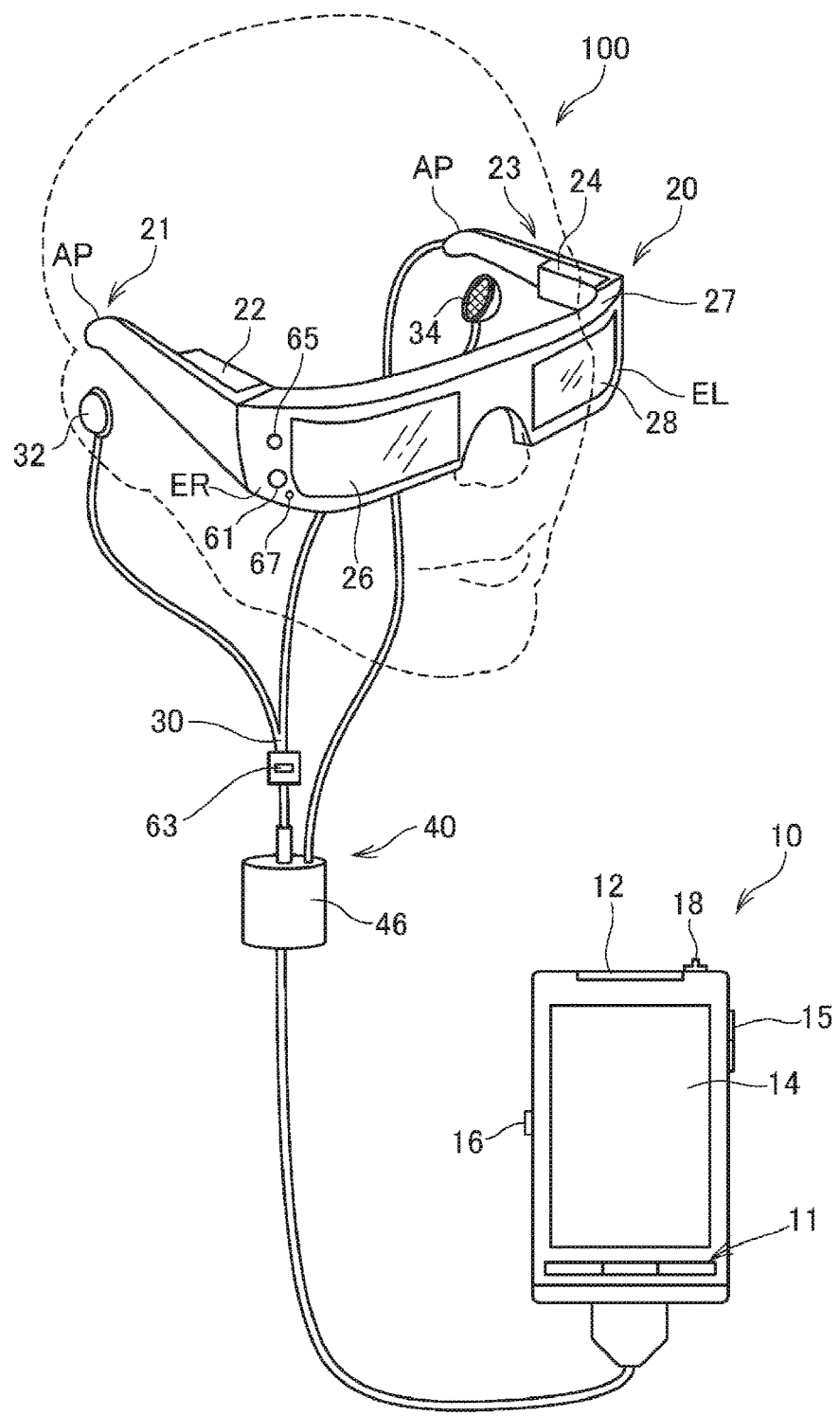
FIG. 1 is an explanatory diagram showing an exterior configuration of an HMD.

FIG. 1 is an explanatory diagram showing an exterior configuration of a head-mounted display (HMD) 100 according to an embodiment to which the invention is applied.

The HMD 100 is a display device provided with an image display section 20 (a display section) for making a user visually recognize a virtual image in the state of being mounted on the head of the user, and a control device 10 for controlling the image display section 20. Further, the control device 10 is provided with a variety of types of buttons, switches, and a track pad 14 for receiving an operation of the user to function as a controller the user to operate the HMD 100.

The image display section 20 is a mounted body to be mounted on the head of the user, and is shaped like a pair of glasses in the present embodiment. The image display section 20 is provided with a right display unit 22 (a first video element), a left display unit 24 (a second video element), a right light guide plate 26, and a left light guide plate 28 in a main body having a right holding part 21, a left holding part 23, a front frame 27.

The right holding part 21 and the left holding part 23 respectively extend backward from both ends of the front frame 27 to hold the image display section 20 on the head of the user in such a manner as the temples of the pair of glasses. Here, out of the both ends of the front frame 27, the end located on the light side of the user in the mounted state of the image display section 20 is defined as an end part ER, and the end located on the left side of the user is defined as an end part EL. The right holding part 21 is disposed so as to extend from the end part ER or the front frame 27 to the position corresponding to the right temporal region of the user in the mounted state of the image display section 20. The left holding part 23 is disposed so as to extend from the end part EL to the position corresponding to the left temporal region of the user in the mounted state of the image display section 20.

The right light guide plate 26 and the left light guide plate 28 is disposed in the front frame 27. The right light guide plate 26 is located in front of the right eye of the user in the mounted state of the image display section 20, and makes the right eye visually recognize the image. The left light guide plate 28 is located in front of the left eye of the user in the mounted state of the image display section 20, and makes the left eye visually recognize the image.

The front frame 27 has a shape connecting an end of the right light guide plate 26 and an end of the left light guide plate 28 to each other, and the connection position corresponds to the glabella of the user in the mounted state in which the user wears the image display section 20. The front frame 27 can also be provided with a nose pad having contact with the nose of the user in the mounted state of the image display section 20 at the connection position between the right light guide plate 26 and the left light guide plate 28. In this case, the image display section 20, can be held on the head of the user by the nope pad, the right holding part 21, and the left holding part 23. Further, it is also possible to connect to the right holding part 21, and the left holding part 23 a belt (not shown) coming into contact with the back of the head of the user in the mounted state of the image display section 20, and in this case, it is possible to hold the image display section 20 on the head of the user with the belt.

The right display unit 22 is a unit related to the display of the image by the right light guide plate 26, and is disposed in the right holding part 21, and is located ire the vicinity of the right temporal region of the user in the mounted state. The left display unit 24 is a unit related to the display of the image by the left light guide plate 28, and is disposed in the left holding part 23, and is located in the vicinity of the left temporal region of the user in the mounted state. It should be noted that the right display unit 22 and the left display unit 24 are also collectively referred to simply as a "display drive section."

The right light guide plate 26 and the left light guide plate 28 in the present embodiment are optical parts formed of light transmissive resin or the like such as prisms, and respectively guide the image light output by the right display unit 22 and the left display unit 24 to the eyes of the user.

Further, it is also possible to dispose a dimming plate (not shown) on a surface of each of the right light guide plate 26 and the left light guide plate 28. The dimming plate is an optical element having a thin-plate like shape different in transmittance by the wavelength band of the light, and functions as a so-called wavelength filter. The dimming plate is disposed, for example, so as to cover the obverse side of the front frame 27, which is the side opposite to the side of the eyes of the user. By arbitrarily selecting the optical characteristic of the dimming plate, it is possible to control the transmittance of the light in an arbitrary wavelength band such as visible light, infrared light, or ultraviolet light, and it is possible to control the light intensity of the outside light having entered the right light guide plate 26 and the left light guide plate 28 from the outside, and then having transmitted through the right light guide plate 26 and the left light guide plate 28.

Although described later in detail, the image display section 20 guides the image light respectively generated by the right display unit 22 and the left display unit 24 to the right light guide plate 26 and the left light guide plate 28, and then makes the user visually recognize the virtual image with the image light to thereby display the image. In the case in which the outside light enters the eyes of the user from the front of the user through the right light guide plate 26 and the left light guide plate 28, it results that the image light constituting the virtual light and the outside light enter the eyes of the user, and thus the visibility of the virtual image is affected by the intensity of the outside light. Therefore, by attach the dimming plate to, for example, the front frame 27, and arbitrarily selecting or adjusting the optical characteristics of the dimming plate, easiness of visual recognition of the virtual image can be controlled. In a typical example, it is possible to use the dimming plate having such light transmittance that the user wearing the HMD 100 can visually recognize at least the outside scenery. Further, if the dimming plates are used, there can be expected an effect of protecting the right light guide plate 26 and the left light guide plate 28 to suppress damages, adhesion of dirt, and so on to the right light guide plate 26 and the left light guide plate 28, respectively. The dimming plates can be arranged to be detachably attached to the front frame 27, or each of the right light guide plate 26 and the left light guide plate 28, or it is possible to arranged that a plurality of types of dimming plates can be attached while being replaced with each other, or the dimming plates can also be omitted.

The camera 61 is disposed on the front frame 27 of the image display section 20. The camera 61 desirably takes an image in the outside scenery direction visually recognized by the user in the state in which the user wears the image display section 20, and is disposed at a position where the camera 61 does not block the outside light transmitted through the right light guide plate 26 or the left light guide plate 28 in the front surface of the front frame 27. In the exam shown in FIG. 1, the camera 61 is disposed on the end part ER side of the front frame 27. It is possible for the camera 61 to be disposed on the end part EL side, or disposed in the connection part between the right light guide plate 26 and the left light guide plate 28.

The camera 61 is a digital camera provided with imaging elements such as CCDs or CMOS elements, an imaging lens, and so on. The camera 61 is a monocular camera in the present embodiment, but can also be formed of a stereo camera. The camera 61 takes an image of at least a part of the outside scenery (a real space) in the obverse side direction of the HMD 100, in other words, in the view field direction of the user in the state of wearing the HMD 100. In another expression, it can be said that the camera 61 takes an image in the range or the direction overlapping the view field of the user, and takes an image in the gaze direction of the user. Although the width of the field angle of the camera 61 can arbitrarily be set, in the present embodiment, the external sight visually recognized by the user through the right light guide plate 26 and the left light guide plate 28 is included as described later. More preferably, the imaging range of the camera 61 is set that the whole of the view field of the user, which can visually be recognized through the right light guide plate 26 and the left light guide plate 28, can be imaged.

The camera 61 takes the image in accordance with the control by an imaging control section 149 provided to a control section 150 (FIG. 5), and then outputs taken image data to the imaging control section 149.

The HMD 100 can also be provided with a distance sensor (not shown) for detecting the distance to a measurement object located in a predetermined measurement direction. The distance sensor can be disposed in, for example, the connection part between the right light guide plate 26 and a left light guide plate 28 in the front frame 27. In this case, in the mounted state of the image display section 20, the position of the distance sensor is roughly the middle of the both eyes of the user in a horizontal direction, and is above the both eyes of the user in the vertical direction. The measurement direction of the distance sensor can be set to, for example, the obverse side direction of the front frame 27, which is a direction overlapping the imaging direction of the camera 61 in other words. It is possible for the distance sensor to be provided with a configuration including a light source such as an LED or a laser diode and a light receiving section for receiving the light, which has been emitted by the light source and then reflected by the measurement object. It is sufficient for the distance sensor to perform a ranging process based on a triangulation process or a temporal difference in accordance the control by the control section 150. Further, it is also possible for the distance sensor have a configuration provided with a sound source for emitting an ultrasonic wave, and a detection section for receiving the ultrasonic wave reflected by the measurement object. In this case, it is sufficient for the distance sensor to perform a ranging process based on a temporal difference from the reflection of the ultrasonic wave in accordance the control by the control section 150.

Figure 2:
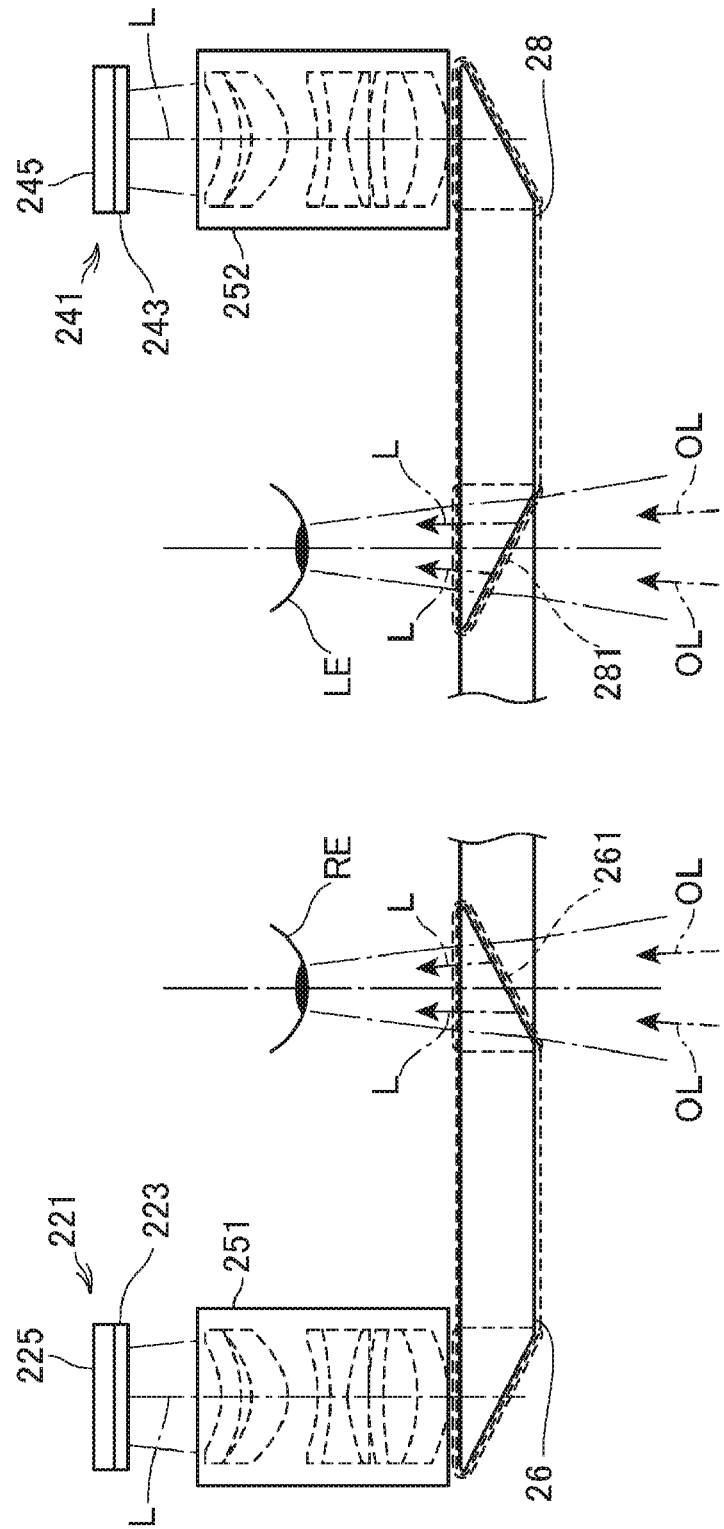
FIG. 2 is a diagram showing a configuration of an optical system of an image display section.

FIG. 2 is a plan view of a substantial part showing a configuration of an optical system provided to the image display section 20. FIG. 2 shows the left eye LE and the right eye RE of the user for the sake of explanation.

As shown in FIG. 2, the right display unit 22 and the left display unit 24 are symmetrically configured. As a configuration of making the right eye RE of the user visually recognize the image, the right display unit 22 is provided with an organic light emitting diode (OLED) unit 221 for emitting the image light, and a right optical system 251 provided with a lens group, which guides the image light L emitted by the OLED unit 221, and so on. The image light L is guided by the right optical system 251 to the right light guide plate 26.

The OLED unit 221 has an OLED panel 223, and an OLED drive circuit 225 for driving the OLED panel 223. The OLED panel 223 is a light-emitting type display panel configured by arranging light emitting elements in a matrix, wherein the light emitting elements emit light due to organic electroluminescene to thereby respectively emit colored light beams of R (red), G (green), and B (blue). The OLED panel 223 is provided with a plurality of pixels each including one R element, one G element, and one B element as a unit, and forms the image using the pixels arranged in a matrix. The OLED drive circuit 225 performs selection and energization of the light emitting elements provided to the OLED panel 223 in accordance with the control by the control section 150 (FIG. 5) to thereby make the light emitting elements of the OLED panel 223 emit light. The OLED drive circuit 225 is fixed to the back surface of the OLED panel 223, namely the reverse side of the light emitting surface, with bonding or the like. It is also possible for the OLED drive circuit 225 to be formed of, for example, a semiconductor device for driving the OLED panel 223, and to be mounted on a substrate (not shown) fixed to the back surface of the OLED panel 223. On this substrate, there is mounted a temperature sensor 217 described later.

It should be noted that it is also possible for the OLED panel 223 to have a configuration in which light emitting elements each emitting white light are arranged in a matrix, and color filters corresponding respectively to the colors of R, G, and B are disposed so as to overlap the light emitting elements. Further, it is also possible to use the OLED panel 223 having WRGB configuration provided with the light emitting elements each emitting W (white) light in addition to the light emitting elements respectively emitting the colored light beams of R, G, and B.

The right optical system 251 includes a collimating lens for converting the image light L having been emitted from the BLED panel 223 into a light beam in a parallel state. The image light L converted by the collimating lens into the light beam in the parallel state enters the right light guide plate 26. In the optical path for guiding the light in the inside of the right light guide plate 26, there is formed a plurality of reflecting surfaces for reflecting the image light L. The image light L is guided to the right eye RE side after a plurality of times of reflection in the inside of the right light guide plate 26. The right light guide plate 26 is provided with a half mirror 261 (a reflecting surface) located in front of the right eye RE. The image light L is reflected by a half mirror 261, and is then emitted from the right light guide plate 26 toward the right eye RE, and then the image light L forms an image on the retina of the right eye RE to make the user visually recognize the image.

Further, as a configuration of making the left eye LE of the user visually recognize the image, the left display unit 24 is provided with an BLED unit 241 for emitting the image light, and a left optical system 252 provided with a lens group, which guides the image light L emitted by the OLED unit 241, and so on. The image light L is guided by the left optical system 252 to the left light guide plate 28.

The OLED unit 241 has an OLED panel 243, and an OLED drive circuit 245 for driving the OLED panel 243. The OLED panel 243 is a light-emitting type display panel configured similarly to the OLED panel 223. The OLED drive circuit 245 performs selection and energization of the light emitting elements provided to the OLED panel 243 in accordance with the control by the control section 150 (FIG. 5) to thereby make the light emitting elements of the OLED panel 243 emit light. The OLED drive circuit 245 is fixed to the back surface of the OLED panel 243, namely the reverse side of the light emitting surface, with bonding or the like. It is also possible for the OLED drive circuit 245 to be formed of, for example, a semiconductor device for driving the OLED panel 243, and to be mounted on a substrate not shown) fixed to the back surface of the OLED panel 243. On this substrate, there is mounted a temperature sensor 239 described later.

The left optical system 252 includes a collimating lens for converting the image light L having been emitted from the OLED panel 243 into a light beam in a parallel state. The image light L converted by the collimating lens into the light beam in the parallel state enters the left light guide plate 28. The left light guide plate 28 is an optical element provided with a plurality of reflecting surfaces for reflecting the image light L such as a prism. The image light L is guided to the left eye LE side after a plurality of times of reflection in the inside of the left light guide plate 28. The left light guide plate 28 is provided with a half mirror 281 (a reflecting surface) located in front of the left eye LE. The image light L is reflected by a half mirror 281, and is then emitted from the left light guide plate 28 toward the left eye LE, and then the image light L forms an image on the retina of the left eye LE to make the user visually recognize the image.

According to this configuration, the HMD 100 functions as a see-through type display device. Specifically, the image light L having been reflected by the half mirror 261 and outside light OL having been transmitted through the right light guide plate 26 enter the right eye RE of the user. Further, the image light L having been reflected by the half mirror 281 and the outside light OL having been transmitted through the half mirror 281 enter the left eye LE. As described above, the HMD 100 makes the image light L having been processed inside and the outside light OL overlap each other and then enter the eyes of the user, and it is possible for the user to see the outside scenery through the right light guide plate 26 and the left light guide plate 28, and to visually recognize the image due to the image light L so as to be superimposed on the outside scenery.

The half mirrors 261, 281 are image taking-out parts for reflecting the image light respectively output by the right display unit 22 and left display unit 24 to take out the image, and can be called a display section.

It should be noted that the left optical system 252 and the left light guide plate 28 are also collectively referred to as a "left light guide section," and the right optical system 251 and the right light guide plate 26 are also collectively referred to as a "right light guide section." The configuration of the right light guide section and the left light guide section is not limited to the example described above, but an arbitrary system can be used as long as the virtual images are formed in front of the eyes of the user using the image light, and it is also possible to use, for example, a diffraction grating or a semi-transmissive reflecting film.

Going back to FIG. 1, the control device 10 and the image display section 20 are connected to each other with a connection cable 40. The connection cable 40 is detachably connected to a connector (not shown) disposed in a lower part of the control device 10, and is connected to the a variety of circuits disposed inside the image display section 20 through the tip of the left holding part 23. The connection cable 40 has a metal cable an optical fiber cable for transmitting digital data, and can also be provided with a metal cable for transmitting an analog signal. In the middle of the connection cable 40, the connector 46 is disposed. The connector 46 is a jack to which a stereo mini-plug is connected, and the connector 46 and the control device 10 are connected to each other with a line for transmitting, for example, an analog audio signal. In the configuration example shown in FIG. 1, a headset 30 having a right earphone and a left earphone 34 constituting a stereo headphone, and a microphone 63 is connected to the connector 46.

Figure 4:
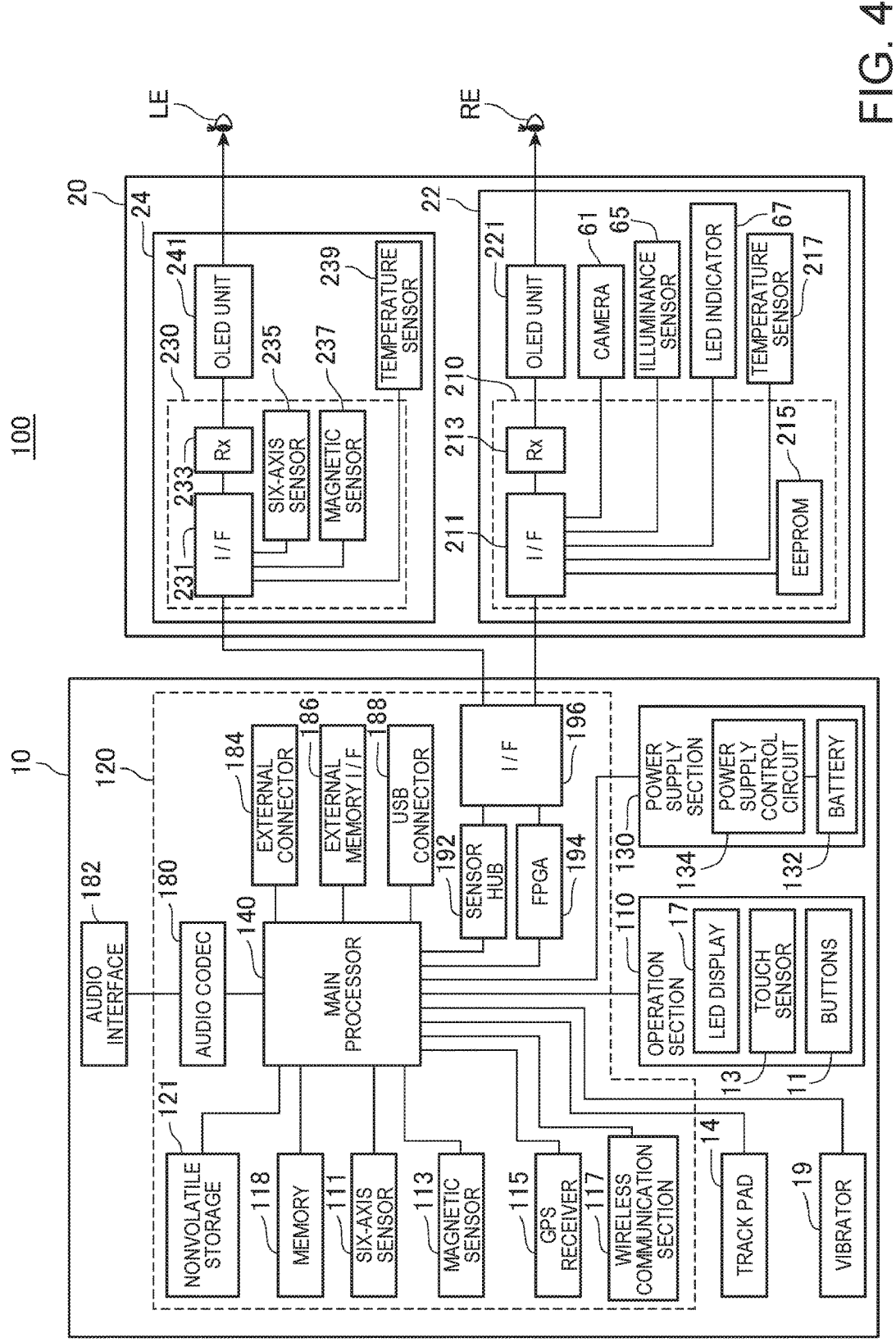
FIG. 4 is a block diagram of components constituting the HMD.

As shown in, for example, FIG. 1, the microphone 63 is disposed so that a sound collection section of the microphone 63 faces to the eye direction of the user, and collects the sound to output an audio signal to an audio interface 182 (FIG. 4). The microphone 63 can be, for example, a monaural microphone or a stereo microphone, or can also be a directional microphone, or an omnidirectional microphone.

The control device 10 is provided with buttons 11, an LED indicator 12, a track pad 14, up/down keys 15, a changing-over switch 16, and a power switch 18 as an operation target parts to be operated by the user.

The buttons 11 include a menu key, a home key, a return key and so on far performing an operation and so on of the operating system 143 (see FIG. 5) executed by the control device 10, and in particular, includes those displaced due to a pressing operation out of these keys and switches. The LED indicator 12 is lighted or blinks in accordance with the operation state of the END 100. The up/down keys 15 are used for an instruction input of increasing or decreasing the volume level of the sound output from the right earphone 32 and the left earphone 34, or an instruction input of increasing or decreasing the luminance of the display of the image display section 20. The changing-over switch 16 is a switch for changing the input corresponding to the operation of the up/down key 15. The power switch 18 is a switch for switching between ON and OFF of the power of the HMD 100, and is formed of, for example, a slide switch.

The track pad 14 has an operation surface for detecting a touch operation, and outputs an operation signal in accordance with the operation to the operation surface. The detection method in the operation surface is not particularly limited, but there can be adopted an electrostatic method, a pressure detection method, an optical method, and so on.

Further, although not shown in the drawings, the control device 10 is provided with a touch operation section for detecting a touch operation. The touch operation section does not have a switch or the like displaced by an operation, and icons representing an operation position and an operation content or the like are disposed using display by a screen or printing. Contact (a touch operation) with the touch operation section is detected by a touch sensor 13 (FIG. 4) described later.

Figure 3A:
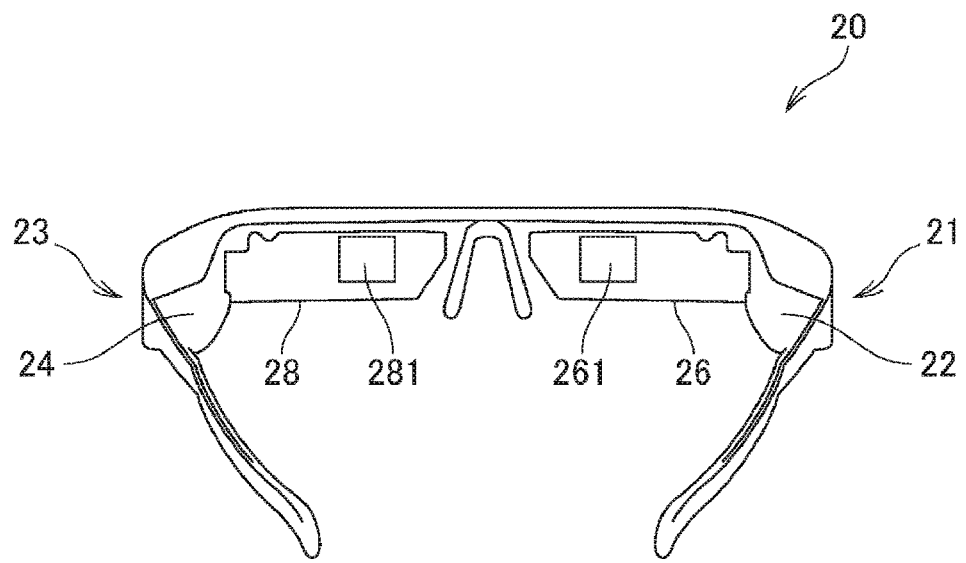
FIGS. 3A and 3B are explanatory diagrams showing correspondence between the image display section and an imaging range.
Figure 3B:
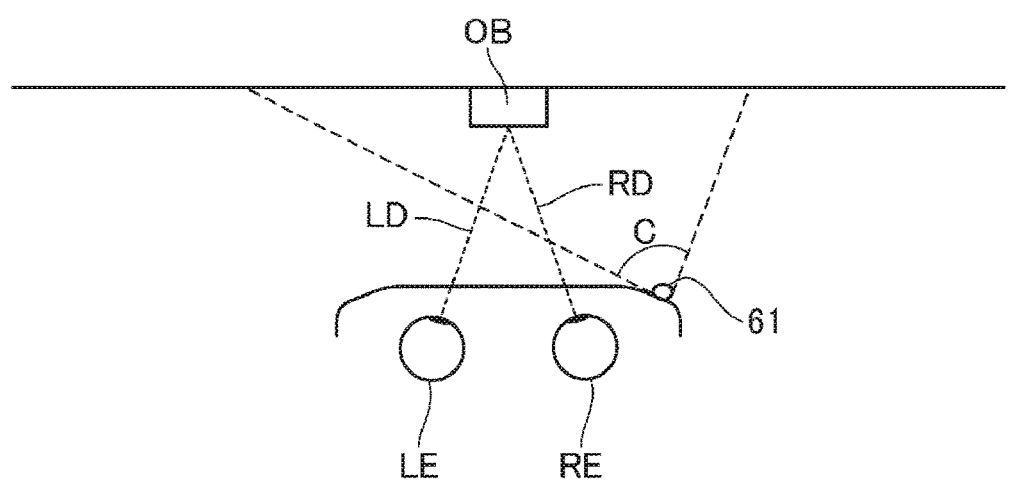

FIGS. 3A and 3B are diagrams showing a configuration of a substantial part of the image display section 20, wherein FIG. 3A is a perspective view of the substantial part of the image display section 20 viewed from the head side of the user, and FIG. 3B is an explanatory diagram of the field angle of the camera 61. It should be noted that in FIG. 3A, the graphical description of connection cable 40 is omitted.

FIG. 3A shows the side of the image display section 20, having contact with the head of the user, in other words, the side thereof which the right eye RE and the left eye LE of the user can see. In another expression, the reverse side of the right light guide plate 26 and the left light guide plate 28 is apparent.

In FIG. 3A, the half mirror 261 for irradiating the right eye RE of the user with the image light, and the half mirror 281 for irradiating the left eye LE with the image light each appear as a roughly quadrangular area. Further, the whole of the right light guide plate 26 and the left light guide plate 28 including the half mirrors 261, 281 transmits the outside light described above. Therefore, the user visually recognizes the outside scenery through the whole of the right light guide plate 26 and the left light guide plate 28, and a rectangular display image is visually recognized at the positions of the half mirrors 263, 281.

The camera 61 is disposed at the end on the side in the image display section 20 as described above, and takes an image in the direction in which the both eyes of the point, namely the front of the user. FIG. 3B is a diagram schematically showing the position of the camera 61 in a planar view together with the right eye RE and the left eye LE of the user. The field angle (imaging range) is represented by C. It should be noted that although FIG. 3B shows the field angle C in the horizontal direction, the actual field angle of the camera 61 also extends in the vertical direction similarly to a general digital camera.

The optical axis of the camera 61 is set to a direction including the eye direction of the right eye RE and the left eye LE. The outside scenery which can visually be recognized in the state in which the user wears the HMD 100 is not necessarily infinity. For example, as shown in FIG. 3B, if the user gazes at the object OB with the both eyes, the sight lines of the user are pointed to the object OB as indicated by the symbols RD, LD in the drawing. In this case, the distance from the user to the object OB is in a range of 30 cm through 10 m in many cases, and is in a range of 1 m through 4 m in most cases. Therefore, it is also possible to determine targets of an upper limit and a lower limit of the distance from the user to the object OB in an ordinary use with respect to the HMD 100. These targets can be obtained by investigation experiments, or can also be set by the user. It is preferable for the optical axis and the field angle of the camera 61 to be set so that the object OB is included in the field angle in the case in which the distance to the object OB in the ordinary use corresponds to the target of the upper limit or the target of the lower limit thus set.

Further, in general, the view angle of a human is assumed to be about 200 degrees in the horizontal direction, and about 125 degrees in the vertical direction, and among the view angle, the effective visual field superior in information receiving performance is roughly 30 degrees in the horizontal direction and roughly 20 degrees in the vertical direction. Further, the stable field of fixation in which the gaze point gazed by the human can promptly and stably be viewed is assumed to be roughly in the range of 60 through 90 degrees in the horizontal direction, and in the range of 45 through 70 degrees in the vertical direction. In this case, if the gaze point is the object OB shown in FIG. 3B, a range of about 30 degrees in the horizontal direction and about 20 degrees in the vertical direction centered on the sight lines RD, LD corresponds to the effective visual field. Further, a range of 60 through 90 degrees in the horizontal direction and 45 through 70 degrees in the vertical direction corresponds to the stable field of fixation, and a range of about 200 degrees in the horizontal direction and about 125 degrees in the vertical direction corresponds to the view angle. Further, the actual visual field to be visually recognized by the user through the image display section 20 and further through the right light guide plate 26 and the left light guide plate 28 can be called a field of view (FOV). In the configuration of the present embodiment shown in FIG. 1 and FIG. 2, the field of view corresponds to the actual visual field visually recognized by the user through the right light guide plate 26 and the left light guide plate 2. The field of view is narrower than the view angle and the stable field of fixation, but is broader than the effective visual field.

It is preferable for the field angle C of the camera 61 to be able to image a range broader than the visual field of the user, and specifically, it is preferable for the field angle C to be broader than at least the effective visual field of the user. Further, it is more preferable for the field angle C to be broader than the field of view of the user. It is more preferable for the field angle C to be broader than the stable field of fixation of the user, and it is the most preferable for the field angle C to be broader than the view angle of the both eyes of the user.

It is also possible to adopt a configuration in which the camera 61 is provided with a so-called wide-angle lens as an imaging lens to be able to image a broader field angle. It is also possible for the wide-angle lens to include a lens called a super-wide-angle lens or a semi-wide-angle lens, or to be a single-focus lens or zoom lens, and it is also possible to adopt a configuration in which the camera 61 is provided with a lens group formed plurality of lenses.

FIG. 4 is a block diagram showing a configuration of the constituents of the HMD 100.

The control device 10 is provided with a main processor 140 for executing a program to control the HMD 100. To the main processor 140, there are connected a memory 118 and a nonvolatile storage 121. Further, to the main processor 140, there are connected a track pad 14 and an operation section 110 as an input device. Further, to the main processor 140, there are connected a six-axis sensor 111, a magnetic sensor 113, and a GPS 115 as sensors. Further, to the main processor 140, there are connected a communication section 117, an audio codec 180, an external connector 184, an external memory interface 186, a USB connector 188, a sensor hub 192, and an FPGA 194. These constituents function as interfaces with external devices.

The main processor 140 is mounted on a controller board 120 incorporated in the control device 10. On the controller board 120, there can also be mounted the memory 118, the nonvolatile storage 121, and so on in addition to the main processor 140. In the present embodiment, the six-axis sensor 111, the magnetic sensor 113, the GPS 115, the communication section 117, the memory 118, the nonvolatile storage 121, the audio codec 180, and so on are mounted on the controller board 120. Further, it is also possible to adopt a configuration in which the external connector 184, the external memory interface 186, the USB connector 188, the sensor hub 192, the FPGA 194, and an interface 196 are mounted on the controller board 120.

The memory 118 constitutes a working area for temporarily storing a program be executed and data to be processed in the case in which the main processor 140 executes the program. The nonvolatile storage 121 is formed of a flash memory or an eMMC (embedded multi-media card). The nonvolatile storage 121 stores the program executed by the main processor 140 and a variety of types of data to be processed by the main processor 140 executing the program.

The main processor 140 detects a contact operation to the operation surface of the track pad 14 based on the operation signal input from the track pad 14 to obtain an operation position.

The operation section 110 includes the buttons 11, the touch sensor 13, and an LED display 17. The touch sensor 13 detects a touch operation to the touch operation section provided to the control device 10. In the case in which the operation of the buttons 11 has been performed, or the case in which the touch sensor 13 has detected the touch operation, the operation signal is output from the operation section 110 to the main processor 140.

The LED display 17 includes LEDs provided to the LED indicator 12 (FIG. 1) and a drive circuit for lighting the LEDs. The LED display 17 lights, blinks, or puts off the LEDs in accordance with the control by the main processor 140. Further, it is possible for the LED display 17 to control the luminance of the light emitted by the LEDs. Further, it is also possible for the LED display 17 to have a configuration in which the LEDs of three colors of red, green, and blue are provided, and in this case, it is possible to control the luminance of the LEDs of the respective colors to thereby make the LED indicator 12 emit light of an arbitrary color.

The six-axis sensor 111 is a motion sensor (an inertial sensor) provided with a triaxial acceleration sensor and a triaxial gyro (angular velocity) sensor. As the six-axis sensor 111, it is possible to adopt an IMU (inertial measurement unit) having the sensors described above modularized.

The magnetic sensor 113 is, for example, a triaxial geomagnetic sensor.

The GPS (global positioning system) 115 is provided with a GPS antenna not shown, and receives radio signals transmitted from GPS satellites to detect the coordinate of the actual location of the control device 10.

The six-axis sensor 111, the magnetic sensor 113 and the GPS 115 output the respective detection values to the main processor 140 in accordance with the sampling period designated in advance. Alternatively, the six-axis sensor 111, the magnetic sensor 113, and the GPS 115 output the respective detection values to the main processor 140 in accordance with the request of the main processor 140 at the timing designated by the main processor 140.

The communication section 117 performs wireless communication with external equipment. The communication section 117 is configured including an antenna, an RF circuit, a baseband circuit, a communication control circuit, and so on, or is formed of a device having these circuits integrated with each other. The communication section 117 performs the wireless communication compliant with a standard such as Bluetooth (registered trademark), or wireless LAN (including Wi-Fi (registered trademark)).

The audio interface 182 is an interface for inputting/outputting the audio signal. In the present embodiment, the audio interface 182 includes a connector 46 (FIG. 1) provided to the connection cable 40. The audio codec 180 is connected to the audio interface 182, and performs encode/decode of the audio signal input/output via the audio interface 182. Further, the audio codec 180 can also be provided with an A/D converter for performing the conversion from the analog audio signal into digital audio data, and a D/A converter for performing the inverse conversion. For example, the HMD 100 according to the present embodiment outputs a sound with the right earphone and the left earphone 34, and collects a sound with the microphone 63. The audio codec 180 converts the digital audio data output by the main processor 140 into the analog audio signal, and then outputs the result via the audio interface 182. Further, the audio codec 180 converts the analog audio signal input to the audio interface 182 into the digital audio data, and then outputs the result to the main processor 140.

The external connector 184 is a connector for connecting an external device communicating with the main processor 140. The external connector 184 is an interface for connecting the external device in the case of, for example, connecting the external device to the main processor 140 to perform debug of the program to be executed by the main processor 140, or collection of the operation log of the HMD 100.

The external memory interface 186 is an interface to which a portable memory device can be connected, and includes, for example, a memory card slot to which a card-type recording medium can be attached to achieve data reading, and an interface circuit. The size, the shape, and the standard of the card-type recording medium in this case are not particularly limited, but can arbitrarily be changed.

The USB (universal serial bus) connector 188 is provided with connector and an interface circuit compliant with the standard, and USB devices, a smartphone, a computer, and so on can be connected to the USB connector 188. The size and the shape of the USB connector 188, and the version of the USB standard with which the USB connector 188 is compliant can arbitrarily be selected or changed.

Further, the HMD 100 is provided with a vibrator 19. The vibrator 19 is provided with a motor (not shown), an eccentric rotor (not shown), and so on, and generates a vibration in accordance with the control by the main processor 140. In the case in which the HMD 100 has detected the operation to the operation section 110, or the case in which the power of the HMD 100 is switched ON/OFF, for example, the HMD 100 generates the vibration in a predetermined pattern with the vibrator 19.

The sensor hub 192 and the FPGA 194 are connected to the image display section 20 via the interface (I/F) 196. The sensor hub 192 obtains the respective detection values of the variety of types of sensors provided to the image display section 20, and then outputs the result to the main processor 140. Further, the FPGA 194 performs processing of data transmitted/received between the main processor 140 and the constituents of the image display section 20, and transmission of the data via the interface 196.

The right display unit 22 and the left is lay unit 24 of the image display section 20 are each connected to the device 10. As shown in FIG. 1, in the HMD 100, the connections cable 40 is connected to the left holding part 23, the interconnection connected to the connection cable 40 is disposed inside the image display section 20, and the right display unit 22 and the left display unit 24 are each connected to the control device 10.

The right display unit 22 has a display unit board 210. On the display unit board 210, there are mounted an interface (I/F) 211 connected to the interface 196, a receiving section (Rx) 213 for receiving the data input from the control device 10 via the interface 211, and an EEPROM 215 (storage).

The interface 211 connects the receiving section 213, the EEPROM 215, the temperature sensor 217, the camera 61, an illuminance sensor 65, and an LED indicator 67 to the control device 10.

The EEPROM (electrically erasable programmable read-only memory) 215 stores the variety of types of data so as to be able to be retrieved by the main processor 140. The EEPROM 215 stores, for example, data related to the light emission characteristics and the display characteristics of the units 221, 241 provided to the image display section 20, and data related to the characteristics of the sensors provided to the right display unit 22 or the left display unit 24. Specifically, the EEPROM 215 stores parameters related to the gamma correction of the OLED units 221, 241, data for compensating the detection values the temperature sensors 217, 239 described later, and so on. These data are generated by the inspection before shipment of the HMD 100, a then written into the EEPROM 215, and then the main processor 140 can perform the process using the data in the EEPROM 215 after the shipment.

The camera 61 performs imaging in accordance with a signal input via the interface 211, and then outputs the taken image data or a signal representing the imaging result to the control device 10.

The illuminance sensor 65 is disposed in the end part ER of the front frame 27 as shown in FIG. 1, and is arranged so as to receive the outside light from the front of the user wearing the image display section 20. The illuminance sensor 65 outputs the detection value corresponding to an amount of light received (intensity of the light received).

The LED indicator 67 is disposed in the vicinity of the camera 61 in the end part ER of the front frame 27 as shown in FIG. 1. The LED indicator 67 is lighted while performing imaging by the camera 61 to give a notification that imaging is in progress.

The temperature sensor 217 (the temperature detection section) detects the temperature, and then outputs a voltage value or a resistance value corresponding to the detected temperature as the detection value. The temperature sensor 217 is mounted on the reverse surface side of the OLED panel 223 (FIG. 2). The temperature sensor 217 can also be mounted on the same board as, for example, the OLED drive circuit 225. Due to this configuration, the temperature sensor 217 mainly detects the temperature of the OLED panel 223.

The receiving section 213 receives the data transmitted by the main processor 140 via the interface 211. In the case in which the receiving section 213 has received the image data of the image to be displayed in the OLED unit 221, the receiving section 213 outputs the image data thus received to the OLED drive circuit 225 (FIG. 2).

The left display unit 24 has a display unit board 230. On the display unit board 230, there are mounted an interface (I/F) 231 connected to the interface 196, and a receiving section (Rx) 233 for receiving the data input from the control device 10 via the interface 231. Further, on the display unit board 230, there are mounted a six-axis sensor 235 and a magnetic sensor 237.

The interface 231 connects the receiving section 233, the six-axis sensor 235, the magnetic sensor 237, and the temperature sensor 239 to the control device 10.

The six-axis sensor 235 is a motion sensor (an inertial sensor) provided with a triaxial acceleration sensor and a triaxial gyro (angular velocity) sensor. As the six-axis sensor 235, it is possible to adopt an IMU (inertial measurement unit) having the sensors described above modularized.

The magnetic sensor 237 is, for example, a triaxial geomagnetic sensor.

The temperature sensor 239 (the temperature detection section) detects the temperature, and then outputs a voltage value or a resistance value corresponding to the detected temperature as the detection value. The temperature sensor 239 is mounted on the reverse surface side of the OLED panel 243 (FIG. 2). The temperature sensor 239 can also be mounted on the same board as, for example, the OLED drive circuit 245. Due to this configuration, the temperature sensor 239 mainly detects the temperature of the OLED panel 243.

Further, the temperature sensor 239 can be incorporated in the OLED panel 243 or the OLED drive circuit 245. Further, the board can be a semiconductor substrate. Specifically, in the case in which the OLED panel 243 is mounted as an Si-OLED together with the OLED drive circuit 245 and so on as an integrated circuit of an integrated semiconductor chip, the temperature sensor 239 can be implemented in the semiconductor chip.

The camera 61, the illuminance sensor 65, and the temperature sensor 217 provided to the right display unit 22, and the six-axis sensor 235, the magnetic sensor 237, and the temperature sensor 239 provided to the left display unit 24 are connected to the sensor hub 192. The sensor hub 192 performs setting and initialization of the sampling period of each of the sensors in accordance with the control by the main processor 140. The sensor hub 192 performs energization of each of the sensors, transmission of the control data, acquisition of the detection value, and so on in accordance with the sampling period of each of the sensors. Further, the sensor hub 192 outputs the detection value of each of the sensors provided to the right display unit 22 and the left display unit 24 to the main processor 140 at predetermined timings. The sensor hub 192 can also be provided with a function of temporarily holding the detection value of each of the sensors in accordance with the output timings to the main processor 140. Further, the sensor hub 192 can also be provided with a function of performing conversion into data with a uniform data format in accordance with the difference in the signal format or the data format of the output value between the sensors, and then outputting the result to the main processor 140.

Further, the sensor hub 192 starts or stops the energization of the LED indicator in accordance with the control by the main processor 140 to thereby light or blink the LED indicator 67 in accordance with the timing at which the camera 61 starts or ends imaging.

The control device 10 is provided with a power supply section 130, and operates with the power supplied from the power supply section 130. The power supply section 130 is provided with a rechargeable battery 132, and a power supply control circuit 134 for performing detection of the remaining capacity of the battery 132 and charge control the battery 132. The power supply control circuit 134 is connected to the main processor 140, and outputs the detection value of the remaining capacity of the battery 132, or the detection value of the voltage to the main processor 140. Further, it is also possible to supply the power from the control device 10 to the image display section 20 based on the power supplied by the power supply section 130. Further, it is also possible to adopt a configuration in which the main processor 140 can control the power supply condition from the power supply section 130 to the constituents of the control device 10 and the image display section 20.

Figure 5:
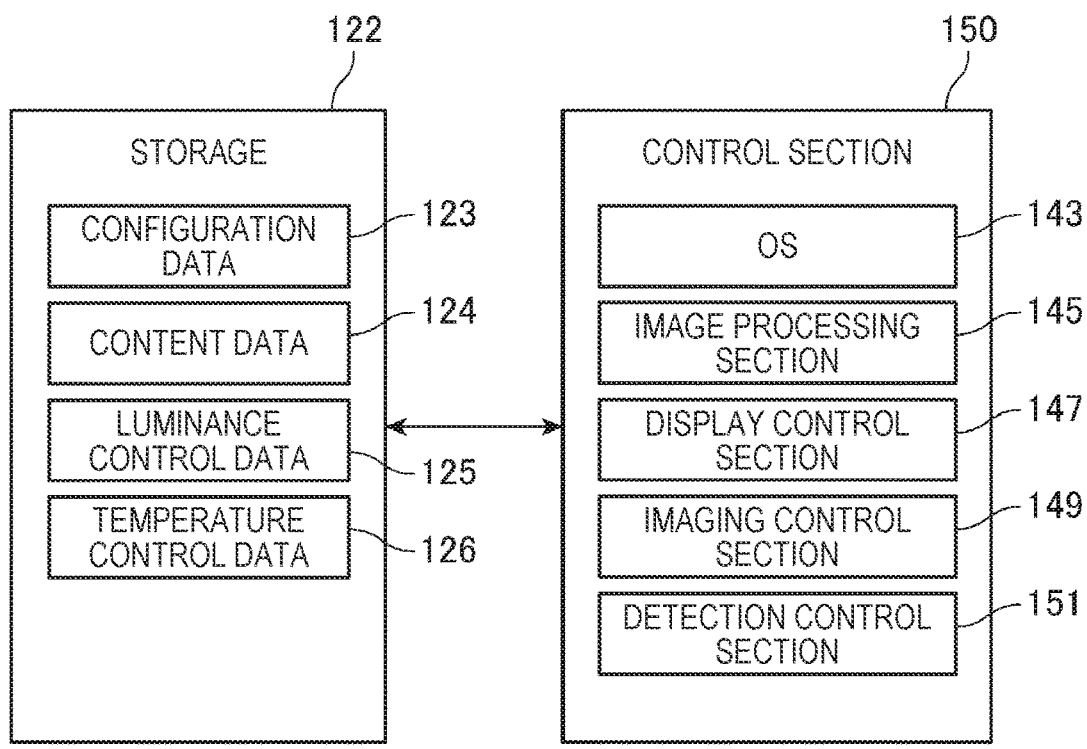
FIG. 5 is a block diagram of a control section and a storage section.

FIG. 5 is a functional block diagram of a storage 122 and the control section 150 constituting a control system of the control device 10. The storage 122 shown in FIG. 5 is a logical storage formed of the nonvolatile storage 121 (FIG. 4), and can include the EEPROM 215. Further, the control section 150 and a variety of functional sections provided to the control section 150 are formed of a cooperation of software and hardware by the main processor 140 executing the program. The control section 150 and the functional sections constituting the control section 150 are configured by, for example, the main processor 140, the memory 118, and the nonvolatile storage 121.

The control section 150 performs a variety of processes using the data stored by the storage 122 to control the HMD 100.

The storage 122 stores the variety of data to be processed by the control section 150. The storage 122 stores configuration data 123, content data 124, luminance control data 125, and temperature control data 126. The configuration data 123 includes a variety of types of setting values related to the operation of the HMD 100. Further, in the case in which the control section 150 uses parameters, determinants, arithmetic expressions, LUTs (lookup tables), and so on when controlling the HMD 100, these can be included in the configuration data 123.

The content data 124 is the data of the content including an image or a video to be displayed by the image display section 20 due to the control by the control section 150, and includes image data or video data. Further, the content data 124 can also include audio data. Further, is also possible for the content data 124 to include image data of a plurality of images, and in this case, the plurality of images is not limited the images to be displayed by the image display section 20 at the same time.

Further, the content data 124 can also be a bidirectional type content in which the control device 10 accepts an operation of the user, and then the control section 150 performs a process corresponding to the operation thus accepted when the image display section 20 displays the content. In this case it is also possible for the content data 124 to include image data of a menu screen to be displayed in the case of accepting the operation, data for determining processes corresponding to items included in the menu screen, and so on.

The luminance control data 125 is data to be referred to by the control section 150 in the case of controlling the luminance of the OLED panels (panels) 223, 243 as described later.

The temperature control data 126 includes threshold values and so on to be used in the case in which the control section 150 performs an operation based on the detected temperatures of the temperature sensors 217, 239. The control section 150 compares, for example, the threshold values included in the temperature control data 126 and the detected temperatures of the temperature sensors 217, 239 with each other to thereby perform control of the luminance of each of the OLED panels 223, 243.

The control section 150 includes functions of an operating system (OS) 143, an image processing section 145, a display control section 147, an imaging control section 149, and a detection control section 151. The function of the operating system 143 is a function of control program stored by the storage 122, and other sections are functions of application programs executed on the operating system 143.

The image processing section 145 generates signals to be transmitted to the right display unit 22 and the left display unit 24 based on the image data of the image or the video displayed by the image display section 20. The signals generated by the image processing section 145 can be a vertical sync signal, a horizontal sync signal, a clock signal, an analog image signal, and so on.

Further, it is also possible for the image processing section 145 to perform a resolution conversion process for converting the resolution of the image data into the resolution suitable for the right display unit 22 and the left display unit 24 if necessary. Further, it is also possible for the image processing section 145 to perform an image adjustment process for adjusting the luminance and the chroma of the image data, a 2D/3D conversion process for generating 2D image data from 3D image data or generating 3D image data from 2D image data, and so on. In the case in which the image processing section 145 has performed the image processing described above, the image processing section 145 generates a signal for displaying the image based on the image data having been processed, and then transmits the signal thus generated to the image display section 20 via the connection cable 40.

The image processing section 145 can be formed of hardware (e.g., a DSP (digital signal processor)) different from the main processor 140 besides the configuration realized by the main processor 140 executing the program.

The display control section 147 generates control signals for controlling the right display unit 22 and the left display unit 4, and controls generation and emission of the image light by each of the right display unit 22 and the left display unit 24 using the control signals. Specifically, the display control section 147 controls the OLED drive circuits 225, 245 to make the OLED panels 223, 243 perform the display of the images. The display control section 147 performs control of the timing at which the OLED drive circuits 225, 245 perform drawing to the OLED panels 223, 243, control of the luminance of each of the OLED panels 223, 243, and so on based on the signals output by the image processing section 145.

The imaging control section 149 controls the camera 61 to perform imaging to thereby generate the taken image data, and then temporarily stores the taken image data in the storage 122. Further, in the case in which the camera 61 is configured as a camera unit including a circuit for generating the taken image data, the imaging control section 149 obtains the taken image data from the camera 61, and then temporarily stores the taken image data in the storage 122.

The detection control section 151 obtains the detection values of the temperature sensors 217, 239, and then obtains either one or both of a detection value and an estimate value of each of the temperatures of the constituents of the image display section 20 based on the detection values thus obtained. The detection control section 151 obtains estimate values of, for example, the temperatures of the OLED panels 223, 243, and the surface temperatures of the right display unit 22 and the left display unit 24. Further, the temperature control data 126 can include data, arithmetic expressions, coefficients, and so on representing a correlation between the detection values of the temperature sensors 217, 239 and the estimate values obtained by the detection control section 151. In this case, the detection control section 151 obtains the estimate values with reference to the temperature control data 126 in the storage 122.

Further, the HMD 100 can also be provided with an interface (not shown) to which a variety of types of external equipment to be a supply source of the content are connected. The interface can be an interface compatible with wired connection such as a USB interface, a micro USB interface, or an interface for a memory card, and it is also possible for the interface to be formed of a wireless communication interface. The external equipment in this case is an image supply device for supplying the HMD 100 with an image, and there are used a personal computer (PC), a cellular phone unit, a portable game machine, and so on. In this case, the HMD 100 can output images and sounds based on the content data input from the external equipment.

Figure 6:
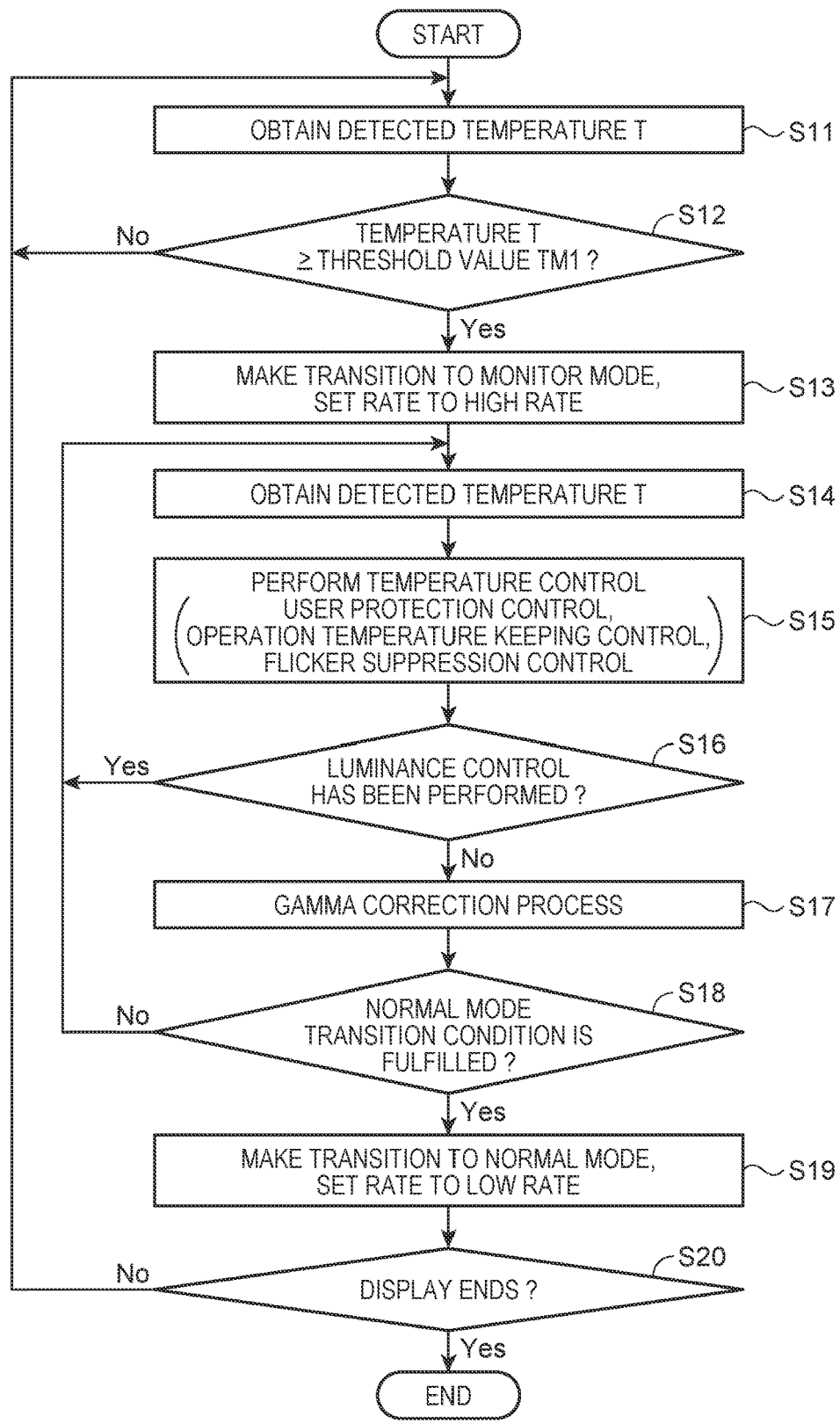
FIG. 6 is a flowchart showing an operation of the HMD.

FIG. 6 is a flowchart showing an operation of the HMD 100.

FIG. 6 shows an operation of controlling the display with the image display section 20 based on the detected temperatures of the temperature sensor 217, 239 provided to the image display section 20 due to the control by the control section 150. Further, the process in the step S15 shown in FIG. 6 will be described in detail with reference to FIG. 7 through FIG. 9.

In the following description, TM1, TM2, TM3, TM4, and TM5 are used as threshold values or reference values for determining the detected temperatures of the temperature sensors 217, 239. These values TM1 through TM5 can be included in the temperature control data 126 stored in the storage 122. In the following description, the values TM1 through TM5 are assumed to be the values which can be compared with the detected temperatures of the temperature sensors 217, 239, but it is sufficient for the values TM1 through TM5 to be the data which can be used for the determination to the detected temperatures of the temperature sensors 217, 239, and the values TM1 through TM5 can also be, for example, a table or arithmetic expressions.

The control section 150 obtains (step S11) the detection values of the temperature sensors 217, 239 due to the detection control section 151. The value obtained in the step S11 is defined as a detected temperature T. Although in the step S11, the detection control section 151 obtains the detection values from both of the temperature sensor 217 and the temperature sensor 239, it is also possible to obtain the detection value from either one of the temperature sensor 217 and the temperature sensor 239. In the present embodiment, the detection control section 151 obtains the detected temperatures of both of the temperature sensors 217, 239, and then sets higher one of the detection value of the temperature sensor 217 and the detection value of the temperature sensor 239 as a temperature T. It should be noted that it is possible for the detection control section 151 to set the data including the two temperature values, namely the detection value of the temperature sensor 217 and the detection value of the temperature sensor 239, as the temperature T. Further, it is also possible to set an average value of the detection value of the temperature sensor 217 and the detection value of the temperature sensor 239, a value obtained by arithmetic processing as the temperature T.

The control section 150 performs two operation modes while switching between the two operation modes based the detected temperatures (the temperature T) of the temperature sensors 217, 239. The two operation modes are different from each other in the period (the sampling period) of obtaining the detection values of the temperature sensors 217, 239. Specifically, the control section 150 performs a normal mode with a low sampling rate (a long sampling period) and a monitor mode with a high sampling rate (a short sampling period). The operation mode performed when obtaining the temperature T in the step S11 is the normal mode, and the temperature T is obtained with a period set to a value in a range of about 5 seconds through 10 seconds, for example.

As the condition for mating the transition from the normal mode to the monitor mode, the control section 150 has a threshold value TM1. The detection control section 151 determines (step S12) whether or not the temperature T obtained in the step S11 is equal to or higher than the threshold value TM1. In the case in which the temperature T is equal to or higher than the threshold value TM1 (Yes in the step S12), the detection control section 151 makes the transition to the monitor mode, and sets the period of obtaining the temperature T to the high rate (step S13). The period of obtaining the temperature T in the monitor mode is, for example, about one second.

Further, in the case in which the temperature obtained in the step S11 is lower than the threshold value TM1 (No in the step S12), the detection control section 151 returns to the step S11.

The detection control section 151 obtains the detected temperatures of the temperature sensors 217, 239 to set the temperature T (step S14). Similarly to the step S11, the temperature T is higher one of the detected temperatures of the temperature sensors 217, 239, but can also be an average value or the like.

The display control section 147 performs (step S15) the temperature control based on the temperature T obtained in the step S14. The temperature control performed by the display control section 147 includes a plurality of processes, and in the present embodiment, includes user protection control, operation temperature keeping control, and flicker suppression control. The display control section 147 separately executes these control processes, and the execution sequence is not particularly limited. Here, there will be described the case in which the display control section 147 performs the user protection control, the operation temperature keeping control, and the flicker suppression control in parallel to each other.

Figure 7:
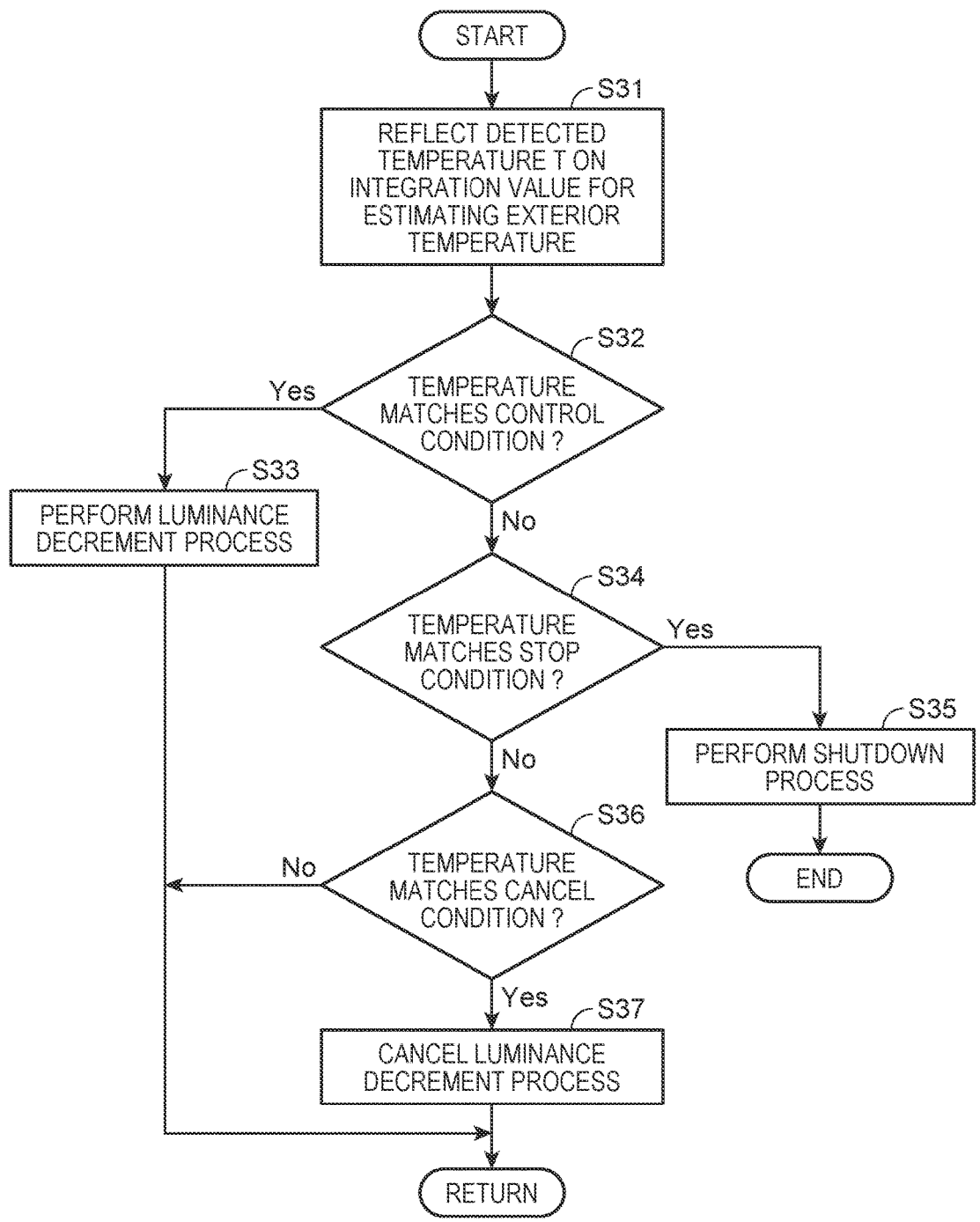
FIG. 7 is a flowchart showing the operation of the HMD.

FIG. 7 is a flowchart showing the operation of the HMD 100, and is a flowchart showing the user protection control constituting a part of the temperature control performed in the step S15 shown in FIG. 6.

The user protection control is the control for suppressing heating of the OLED units 221, 241 in order to suppress a thermal influence on the user exerted by the right display unit 22 and the left display unit 24. The right display unit 22 and the left display unit 24 come close to the temples of the user in the mounted state of the image display section 20, and have contact with the temples in some cases. Since in the case in which the exterior temperature of the right display unit 22 and the left display unit 24 heated to a high temperature due to heating of the OLED panels 223, 243, the temples of the user are provided with the heat, there is a concern that feeling of strangeness or an uncomfortable feeling of the user is incurred.

The HMD 100 performs the control of suppressing the exterior temperature of the right display unit 22 and the left display unit 24 based on the temperature T as the detected temperature of the temperature sensor 217 or 239. Specifically, the display control section 147 determines the possibility that the exterior temperature of the right display unit 22 and the left display unit 24 exceeds the restrictive temperature based on the history of the variation of the temperature T, and then decreases the luminance of the OLED units 221, 241 in the case in which the possibility is high. The criteria for the display control section 147 to perform the determination is determined in advance based on the correlation between the detected temperatures of the temperature sensors 217, 239 and the exterior temperatures of the right display unit 22 and the left display unit 24 obtained experimentally and so on. The display control section 147 determines whether or not the history of the temperature T fulfills a condition. As the condition, there is set a condition that, for example, the state in which the temperature T exceeds the threshold value TM3 set in advance continues for a period equal to or longer than a preset time.

In FIG. 7, the display control section 147 makes the temperature T obtained in the step S14 (FIG. 6) be reflected on an integration value for estimating the exterior temperature (step S31). The integration value for estimating the exterior temperature is a value to be added based on the time and the value of the temperature T. In the step S31, the display control section 147 adds the integration value for estimating the exterior temperature based on the temperature T. It is possible to add the integration value only in the case in which the temperature T is equal to or higher than the threshold value TM3, it is also possible to add the integration value in the case in which the temperature is lower than the threshold valued TM3.

The display control section 147 determines (step S32) whether or not the integration value for estimated the exterior temperature matches the condition for the luminance control set in advance. In the case in which the integration value for estimating the exterior temperature matches the condition for the luminance control (Yes in the step S32), the display control section 147 performs (step S33) a luminance decrement process for decreasing the display luminance of the OLED panels 223, 243. In the luminance decrement process in the step S33, the display control section 147 decreases the luminance of both of the OLED panels 223, 243. Therefore, since the luminance of the image light visually recognized by the user in the image display section 20 decreases on both of the right and left sides, the luminance can be controlled without providing the feeling of strangeness. Further, the decrement of the luminance in a single process in the step S33 is set in advance to such an amount that the feeling of strangeness of the user is not incurred.

In the case in which the integration value for estimating the exterior temperature fails to match the condition for the luminance control (No in the step S32), the display control section 147 determines (step S34) whether or not the integration value for estimating the exterior temperature matches a stop condition. The stop condition is a condition for stopping the HMD 100, and is a condition representing the fact that the exterior temperature of the right display unit 22 or the left display unit 24 has become a severer state. In the case in which the integration value for estimated the exterior temperature matches the stop condition (Yes in the step S34), the display control section 147 performs (step S35) a shutdown sequence for stopping the HMD 100 and then terminates the present process. Although the HMD 100 is forcibly shut down in order to avoid damage to the OLED units 221, 241 in the step S35 also possible to forcibly stop energization to, for example, the image display section 20.

In other words, in the operation of the steps S33 through S35, the display control section 147 performs the luminance decrement process in the case in which the exterior temperature of the right display unit 22 or the left display unit 24 is high, and the display control section 147 performs the shutdown process in the case in which it is necessary to more promptly decrease the exterior temperature.

In the case in which the integration value for estimating the exterior temperature fails to match the stop condition (No in the step S34), the display control section 147 determines (step S36) whether or not the integration value for estimating the exterior temperature matches a cancel condition for the luminance decrement. The cancel condition is a condition for cancelling the luminance decrement process d in the step to restore the luminance of the OLED panels 223, 243 to the state in which the process in the step S33 has not yet been performed. In other words, the cancel condition is a condition corresponding to the state in which it can be said that the exterior temperature of the right display unit 22 and the left display unit 24 is sufficiently low.

In the case in which the integration value for estimating the exterior temperature matches the cancel condition (Yes in the step S36), the display control section 147 cancels the luminance decrement process having been performed in the step S33, then adjusts (step S37) the luminance of the OLEO panels 223, 243, and then returns to the operation shown in FIG. 6.

Further, in the case in which the integration value for estimating the exterior temperature fails to match the cancel condition (No in the step S36), the display control section 147 returns to the operation shown in FIG. 6.

The integration value for estimating the exterior temperature used in the user protection control shown in FIG. 7 is held in, for example, the memory 118 (FIG. 4), and is added, updated, and referred to due to the function of the display control section 147. Further, the control condition, the stop condition, and the cane condition used in the user protection control can also be included in the luminance control data 125 stored in the storage 122.

Figure 8:
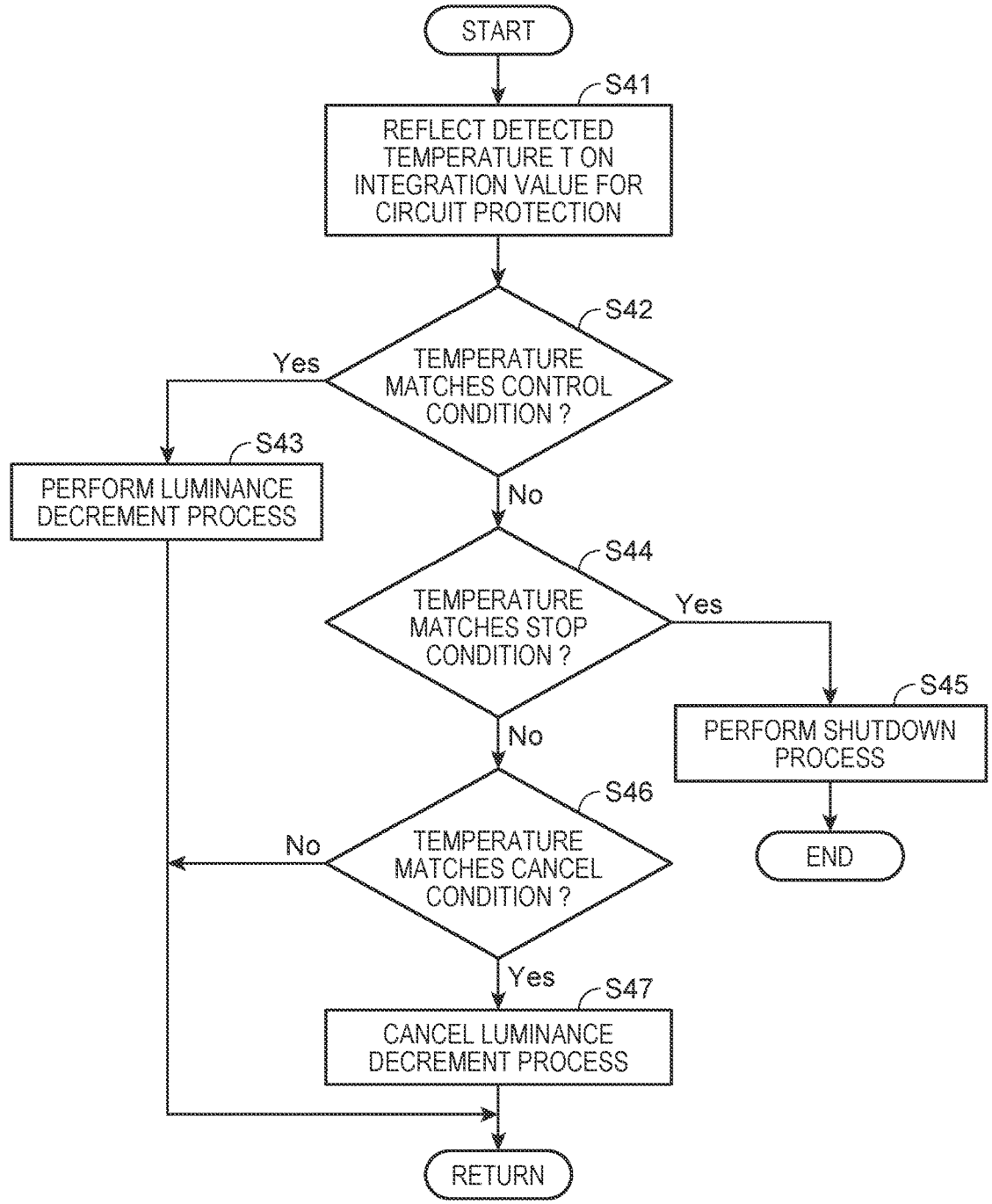
FIG. 8 is a flowchart showing the operation of the HMD.

FIG. 8 is a flowchart showing the operation or the HMD 100, and is a flowchart showing the operation temperature keeping control constituting part of the temperature control performed in the step S15 shown in FIG. 6.

The operation temperature keeping control is control for preventing the temperature of the OLED units 221, 241 or the OLED panels 223, 243 from changing beyond the operation temperature range determined based on the operation guarantee temperature determined by the manufacturer.

The HMD 100 performs the control of suppressing the temperature of the OLED panels 223, 243 and the OLED drive circuits 225, 245 based on the temperature T as the detected temperature of the temperature sensor 217 or 239. Specifically, the display control section 147 determines the possibility that the temperature of the OLED panels 223, 243 and the OLED drive circuit 225, 245 changes beyond the operation temperature range based on the history of the variation of the temperature T, and then decreases the luminance of the OLED units 221, 241 in the case in which the possibility is high. The criteria for the display control section 147 to perform the determination is determined in advance based on the correlation between the detected temperatures of the ripe tore sensors 217, 239 and the temperatures of the OLED panels 223, 243 and the OLED drive circuits 225, 245 obtained experimentally and so on. The display control section 147 determines whether or not the history of the temperature fulfills a condition. As the condition, there is set a condition that, for example, the state in which the temperature T exceeds the threshold value TM4 set in advance continues for a period equal to or longer than a preset time.

In FIG. 3, the display control section 147 makes the temperature T obtained in the step S14 (FIG. 6) be reflected on an integration value for circuit protection (step S41). The integration value for the circuit protection is a value to be added based on the time and the value of the temperature T. In the step S41, the display control section 147 adds the integration value for the circuit protection based on the temperature T. It is possible to add the integration value only in the case in which the temperature T is equal to or higher than the threshold value TM4, or it is also possible to add the integration value in the case in which the temperature is lower than the threshold value TM4.

The display control section 147 determines (step S42) whether or not the integration value for the circuit protection matches the condition for the luminance control set in advance. In the case in which the integration value for the circuit protection matches the condition for the luminance control (Yes in the step S42), the display control section 147 performs (step S43) a luminance decrement process for decreasing the display luminance of the OLED panels 223, 243. In the luminance decrement process in the step S43, the display control section 147 decreases the luminance of both of the OLED panels 223, 243. Therefore, since the luminance of the image light visually recognized by the user in the image display section 20 decreases on both of the right and left sides, the luminance can be controlled without providing the feeling of strangeness. Further, the decrement of the luminance in a single process in the step S43 is set in advance to such an amount that the feeling of strangeness of the user is not incurred.

In the case in which the integration value for the circuit protection fails to match the condition for the luminance control (No in the step S42), the display control section 147 determines (step S44) whether or not the integration value for the circuit protection matches a stop condition. The stop condition is a condition for stopping the HMD 100, and is a condition representing the fact that the temperature of the OLED panels 223, 243 or the OLED drive circuits 225, 245 has become a severer state. In the case in which the integration value for the circuit protection matches the stop condition (Yes in the step S44), the display control section 147 performs (step S45) a shutdown sequence for stopping the HMD 100 and then terminates the present process. Although the HMD 100 is ford shut down in order to avoid damage to the OLED units 221, 241 in the step S45, it is also possible to forcibly stop energization to, for example, the image display section 20.

In the case in which the integration value for the circuit protection fails to match, the stop condition (No in the step S44), the dispel control section 147 determines (step S46) whether or not the integration value for the circuit protection matches a cancel condition for the luminance decrement. The cancel condition is a condition for canceling the luminance decrement process performed in the step S43 to restore the luminance of the OLED panels 223, 243 to the state in which the process in the step S43 has not yet been performed. In other words, the cancel condition is a condition corresponding to the case in which the temperature of the OLED panels 223, 243 or the OLED drive circuits 225, 245 is sufficiently lower than an upper limit of the operation temperature range.

In the case in which the integration value for the circuit protection matches the cancel condition (Yes in the step S46), the display control section 147 cancels the luminance decrement process having been performed in the step S43, then adjusts (step S47) the luminance of the OLED panels 223, 243, and then returns to the operation shown in FIG. 6.

Further, in the case in which the integration value for the circuit protection fails to match the cancel condition (No in the step S46), the display control section 147 return to the operation shown in FIG. 6.

The integration value for the circuit protection shown in FIG. 8 is held in, for example, the memory 118 (FIG. 4), and is added, updated, and referred to due to the function of the display control section 147. Further, the control condition, the stop condition, and the cancel condition used in the operation temperature keeping control can also be included in the luminance control data 125 stored in the storage 122.

Figure 9:
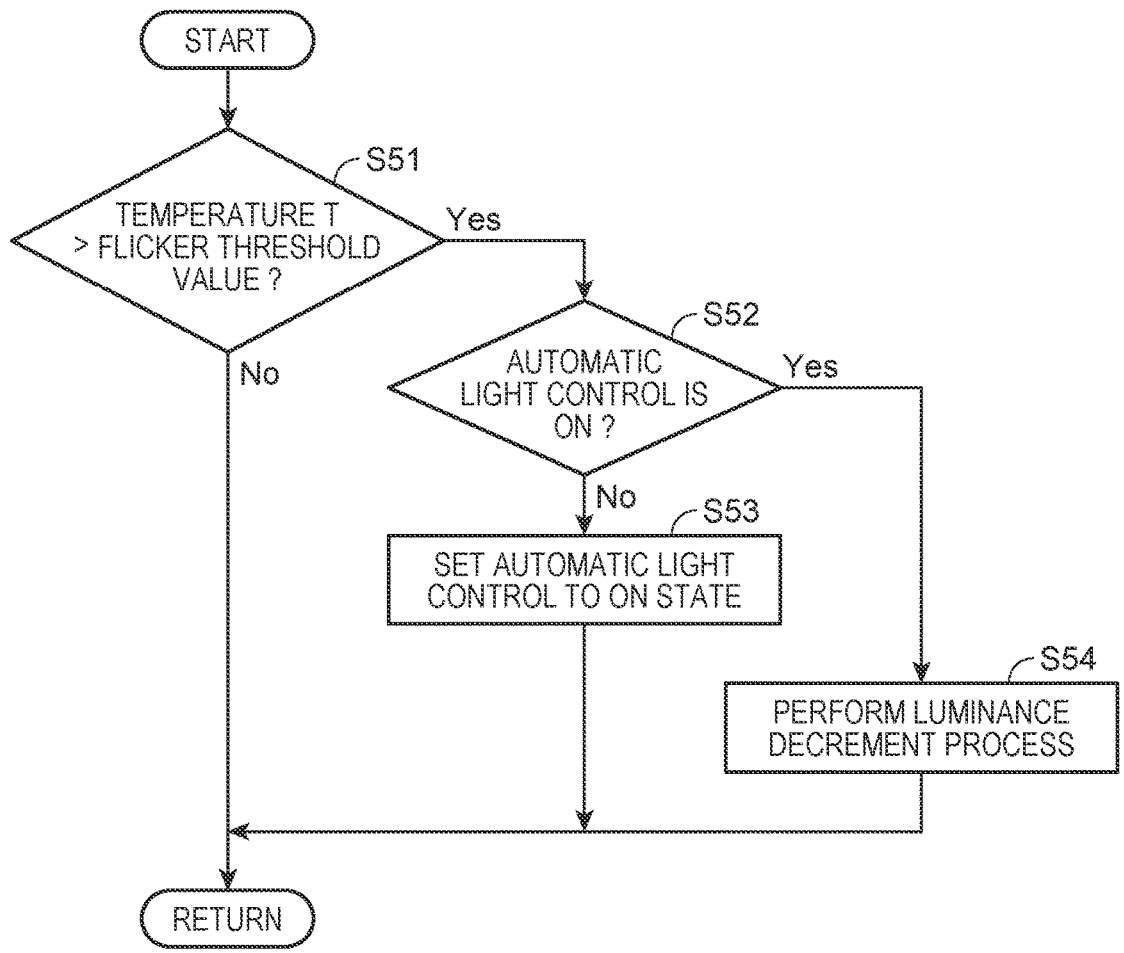
FIG. 9 is a flowchart showing the operation of the HMD.

FIG. 9 is a flowchart showing the operation of the HMD 100, and is a flowchart showing the flicker suppression control constituting a part of the temperature control performed in the step S15 shown in FIG. 6. The flicker suppression control is control for keeping the temperature of the OLED panels 223, 243 at a temperature lower than the temperature at which the possibility of developing the flickers is high to thereby maintain the display quality.

The detection control section 147 determines (step S51) whether or not the temperature T obtained in the step S14 (FIG. 4) is higher than a flicker threshold value TM5. The flicker threshold value TM5 is a threshold value set as an index at which the flicker can be suppressed in view of the fact that the clicker of the display image occurs due to rise in temperature of the OLED panels 223, 243.

In the case in which the temperature T obtained in the step S11 is higher than the threshold value TM5 (Yes in the step S51), the display control section 147 determines (step S52) whether or not automatic light control has been set to the ON state in the operation state of the HMD 100. The automatic light control an optional function for automatically controlling the luminance of the OLED units 221, 241 based on the detection value of the illuminance sensor 65. In the case in which the automatic light control is in the ON state, the luminance of the OLED panels 223, 243 is controlled to a lower limit luminance with which the visibility of the display images of the right display unit 22 and the left display unit 24 can be ensured compared to the light intensity of the outside light detected by the illuminance sensor 65. In other words, the luminance of the OLED panels 223, 243 is set to the minimum luminance in the range in which the display images of the right display unit 22 and the left display unit 24 can visually be recognized. Therefore, if the automatic light control is set to the ON state, the OLED panels 223, 243 become hard to generate heat, and rise in temperature is suppressed. Further, if the automatic light control is set to the ON state, the luminance of the OLED panel 223 in the right display unit 22 and the luminance of the OLED panel 243 in the left display unit 24 are set to luminance values corresponding to each other. In more detail, the luminance of the OLED panel 223 and the luminance of the OLED panel 243 are set in accordance with lower one of the luminance of the OLED panel 223 and the luminance of the OLED panel 243. In contrast, in the case in which the automatic light control is in the OFF state, the luminance of the OLED panel 223 and the luminance of the OLED panel 243 can separately be set, and can be set independently of the light intensity of the outside light, and are therefore apt to become high luminance.

In the case in which the automatic light control is in the OFF state (No in the step S52), the display control section 147 sets (step S53) the automatic light control to the ON state, and then returns to the operation shown in FIG. 6. Further, in the case in which the automatic light control has already been in the ON state (Yes in the step S52), the display control section 147 sets (step S54) the luminance of the OLED panels 223, 243 to be one step lower than the current luminance, and then returns to the operation shown in FIG. 6. Further, in the case in which the temperature T obtained in the step S11 is equal to or lower than the flicker threshold value TM5 (No in the step S51), the display control section 147 returns to the operation shown in FIG. 6.

Going back to FIG. 6, the display control section 147 determines (step S16) whether or not the operation of controlling the luminance of the OLED panels 223, 243 has been performed in either of the temperature control processes having been performed in the step S15. The determination in the step S16 can also be performed by flow control after the process in the step S15 is completed, but in the case in which the control of the luminance is performed in the temperature control in the step S15, the determination in the step S16 can be performed using an interrupt operation. In the step S16 in the present embodiment, whether or not the display control section 147 has performed some process accompanied by a change in luminance of the OLED panels 223, 243 is determined, and the content of the process is not limited.

In the case in which either one of the steps S33, S37 shown in FIG. 7, the steps S43, S47 shown in FIG. 8, and the steps S53, S54 shown in FIG. 9 has been performed, it is determined in the step S16 that the luminance of the OLED panels 223, 243 has been controlled. In the case in which it has been determined that the luminance of the OLED panels 223, 243 has been controlled (Yes in the step S16), the display control section 147 performs (step S17) the gamma correction of the OLED units 221, 241. In the step S17, it is possible for the display control section 147 to newly obtain the temperature T using the detection control section 151. In this case, the HMD 100 stores the parameters for the gamma correction for each of the temperature values of the OLED panels 223, 243 in the EEPROM 215. In the step S17, the display control section 147 retrieves the parameters for the gamma correction corresponding the temperature of the OLED panels 223, 243 from the EEPROM 215 and then applies the parameters to thereby perform the gamma correction of the OLED panels 223, 243. Thus, it is possible to appropriately correct the variation in color tones due to the temperature of the OLED panels 223, 243 to thereby display the image with high display quality. In the gamma correction process in the step S17, it is also possible for the display control section 147 to perform the gamma correction of the OLED panel 223 using the parameters for the gamma correction based on the detected temperature of the temperature sensor 217. Further, it is also possible to perform the gamma correction of the OLED panel 243 using the parameters for the gamma correction corresponding to the detected temperature of the temperature sensor 239. Further, it is also possible to configure the control section 150 so as to always perform the gamma correction during the period of performing the display by the image display section 20. In this case, it is sufficient for the control section 150 to update the table or the parameters used for the gamma correction with the table or the parameters for the gamma correction corresponding to the detected temperature of the temperature sensor 239.

Subsequently, the control section 150 determines (step S18) whether or not the temperature T obtained in the step S14 or the temperature T obtained at the timing after the step S14 fulfills the transition condition from the monitor mode to the formal mode. The transition condition to the normal mode is, for example, the threshold value TM2 to be compared to the temperature T obtained in the step S14 or at the timing after the step S14. In the case in which it has been determined that the normal mode transition condition is not fulfilled (No in the step S18), the control section 150 returns to the step S14.

Further, in the case in which it has been determined that the normal mode transition condition is fulfilled (Yes in the step S18), the control section 150 makes the transition of the operation mode from the monitor mode to the normal mode to set the rate of obtaining the detection value of the temperature sensors 217, 239 to the low rate (step S19). The control section 150 determines (step S20) whether or not a termination condition for terminating the display has been fulfilled. The termination condition is that an instruction of terminating the display is input by the operation section 110 or the track pad 14, that the remaining capacity of the battery of the power supply section 130 becomes insufficient, or that the reproductive display of the content data 124 ends. In the case in which the termination condition is not fulfilled (No in the step S20), the control section 150 returns to the step ill, and in the case in which the termination condition has been fulfilled (Yes in S20), the control section 150 terminates the present process.

In the process of decreasing the luminance of the OLED panels 223, 243 performed in the steps S33, 343, and S54, it is also possible to lower the grayscale or the luminance of the whole of the OLED panels 223, 243. Further, it is also possible to perform the control of limiting the pixels for emitting light out of the pixels constituting the OLED panels 223, 243 to make some of the pixels emit light. In this case, it is possible to lower the temperature of the OLED panels 223, 243 or suppress the rise in temperature by decreasing the number of pixels for emitting light. Further, it is possible to perform display using the pixels for emitting light although the range is narrower than in the case of using all of the pixels of the OLED panels 223, 243.

As described hereinabove, the HMD 100 worn by the user to use includes the right display unit 22 and the left display unit 24 for generating the picture light. Further, the HMD 100 is provided with the image display section 20 for making the right eye of the user visually recognize an image based on the light emitted by the right display unit 22 and making the left eye of the user visually recognize an image based on the light em fitted by the left display unit 24. Further, the HMD 100 is provided with the temperature sensors 217, 239 for detecting the respective temperatures of the right display unit 22 and the left display unit 24. Further, the HMD 100 is provided with the control section 150 for controlling the luminance of at least either one of the right display unit 22 and the left display unit 24 based on the temperatures detected by the temperature sensors 217, 239. Due to this configuration, it is possible to control the luminance of the picture light output by the right display unit 22 or the left display unit 24 in accordance with the change in temperature of the right display unit 22 or the left display unit 24 to keep the operation temperature of the right display unit 22 and the left display unit 24 within an appropriate range.

Further, the control section 150 performs the control of conforming the luminance of the picture light emitted by the right display unit 22 and the luminance of the picture light emitted by the left display unit 24 to the luminance of the side emitting the light with lower luminance out of the right display unit 22 and the left display unit 24 based on the temperature of the right display unit 22 and the left display unit 24. Due to this configuration, is possible to control the luminance in accordance with rise in temperature of the right display unit 22 and the left display unit 24 to keep the operation temperature within an appropriate range without extremely changing the visibility of the display image.

Further, the control section 150 performs the control of conforming the luminance of the right panel display unit 22 and the luminance of the left display unit 24 to the luminance of the side emitting the light with lower luminance in the case in which the temperature of either one of the right display unit 22 and the left display unit 24 becomes equal to or higher than the threshold value. Thus, it is possible to decrease the luminance in accordance with rise in temperature of either one of the right display unit 22 and the left display unit 24 without extremely changing the visibility of the display image to thereby keep the operation temperature within an appropriate range.

Further, the control section 150 performs the control of conforming the luminance of the right display unit 22 and the luminance of the left display unit 24 to the luminance corresponding to the illuminance of the outside light of the image display section 20 based on the temperature of the right display unit 22 and the left display unit 24. In other words, the automatic light control for controlling the luminance of the OLED panels 223, 243 in accordance with the detection value of the illuminance sensor 65 is performed. Thus, it is possible to control the luminance of the right display unit 22 and the left display unit 24 in accordance with the brightness of the environmental light of the HMD 100 to thereby control the luminance without extremely lowering the visibility of the display image.

Further, the image display section 20 has configuration of making the user visually recognize the image based on the light emitted by right display unit 22 and the light emitted by the left display unit 24, and transmitting the outside scenery to make the user visually recognize the outside scenery. The control section 150 performs the control of conforming the luminance of the right display unit and the left display unit 24 to the luminance corresponding to the illuminance of the outside light transmitted through the image display section 20. Thus, the luminance of the right display unit 22 and the left display unit 24 is controlled in accordance with the illuminance of the outside light in the configuration in which the user visually recognizes the outside light transmitted through the image display section 20 and the light emitted by the right display unit 22 and the left display unit 24 in a superimposed manner. Due to this configuration, it is possible to control the luminance of the right display unit 22 and the left display unit 24 while ensuring the visibility of both of the outside scenery visually recognized using the outside light and the display image.

Further, the image display section 20 is provided with the right light guide plate 26 for guiding the light emitted by the right display unit 22 to the right eye of the user, and the left light guide plate 28 for guiding the light emitted by the left display unit 24 to the left eye of the user. Thus, the luminance can be controlled in accordance with the rise in temperature of the right display unit 22 and the left display unit 24 while keeping an appropriate balance in the luminance between the images visually recognized by the right eye and the left of the user.

Further, the right display unit 22 and the left lay unit 24 are respectively located on the sides of the head of the user. It is possible to control the luminance in accordance with rise in temperature of the right display unit 22 and the left display unit 24 located on the sides of the head of the user to thereby keep the operation temperature within an appropriate range.

Further, in the case in which the temperature of at least either of the right display unit 22 and the left display unit 24 becomes equal to or higher than the threshold value determined based on the influence on the body if the user, the control section 150 decreases the luminance of at least either of the right display unit 22 and the left display unit 24.

Due to this configuration, it is possible to control the luminance before the temperature of the right display unit 22 and the left display unit 24 located on the sides of the head of the user becomes the temperature at which the influence on the body of the user is concerned to thereby cope with the rise in temperature.

Further, since the right display unit and the left display unit 24 are respectively provided with the OLED panels 223, 243 each having a light emitting element mounted thereon, and the temperature sensors 217, 239 are disposed on the back side of the light emitting element so as to have contact with the OLED panels 223, 243, the temperature change due to the light emission can accurately be detected.

Further, the right display unit 22 and the left display unit 24 are respectively provided with the OLED panels 223, 243 as picture elements for outputting image light including a plurality of colored light beams, and the OLED drive circuits 225, 245 for driving the OLED panels 223, 243. The temperature sensors 217, 239 are mounted on the OLED drive circuits 225, 245 to detect the temperatures of the OLED panels 223, 243, respectively. Therefore, the configuration of driving the OLED panels 223, 243 to perform the display, and detecting the temperature with the temperature sensors 217, 239 can be realized using a compact configuration.

Further, there is provided the EEPROM 215 for storing the correction parameters for correcting the gamma value of the image light emitted by the OLED panels 223, 243 for each of the temperature values of the OLED panels 223, 243. The control section 150 controls the luminance of at least either one of the right display unit 22 and the left display unit 24 based on the temperatures detected by the temperature sensors 217, 239. Further, the control section 150 performs the gamma correction of the OLED panels 223, 243 using the correction parameters corresponding to the temperatures detected by the temperature sensors 217, 239. Therefore, by correcting the color of the light emitted by the OLED panels 223, 243, the quality of the display image can be kept in a high level.

Further, in the embodiment described above, there is illustrated the configuration in which the temperature sensors 217, 239 are mounted together with the OLED drive circuits 225, 245. The invention is not limited to this configuration, and it is also possible to dispose the temperature sensors 217, 239 as separate members from the OLED units 221, 241, for example.

Further, in the case in which the six-axis sensor 235 and the magnetic sensor 237, or the IMU constituting the six-axis sensor 235 and the magnetic sensor 237 has the temperature detection function, it is also possible for the control section 150 to perform the temperature detection using the six-axis sensor 235 and the magnetic sensor 237. In this case, it is also possible for the control section 150 to compare the detection values obtained from the temperature sensors 217, 239 by the detection control section 151 and the temperature detected by the six-axis sensor 235 and the magnetic sensor 237 with each other. Due to the comparison, it is also possible for the control section 150 to determine whether or not the operations of the temperature sensors 217, 239 are normal. The sensors are mounted on a substrate on the reverse surface of the panel constituting the case of the left display unit 24, for example. In is also possible for the control section 150 to use the temperature detected by the six-axis sensor 235 and the magnetic sensor 237 in the process shown in FIG. 7 in addition to the detection values obtained from the temperature sensors 217, 239. In this case, it is possible to perform the control of lowering the temperature in the case in which the temperature detected by the six-axis sensor 235 and the magnetic sensor 237 becomes the temperature having possibility of affecting the body of the user besides the temperature sensors 217, 239. Further, by using the plurality of temperature sensors, there is an advantage that in the case in which a malfunction or a trouble occurs in either of the temperature sensors, the malfunction and the trouble can be detected. Further, by using the sensors located at positions different from each other in the inside of the left display unit 24, there is an advantage that the control corresponding to the temperature difference in the inside of the left display unit 24 can be performed.

In the embodiment described above, there is illustrated the configuration in which the right display unit 22 and the left display unit 24 emit the image light by the OLED panels 223, 243, and the image light is guided to the eyes of the user to thereby make the image be visually recognized. Here, the right display unit 22 and the left display unit 24 can also be called a picture element, or it is also possible to define the OLEO panels 223, 243 as the picture element.

Figure 10:
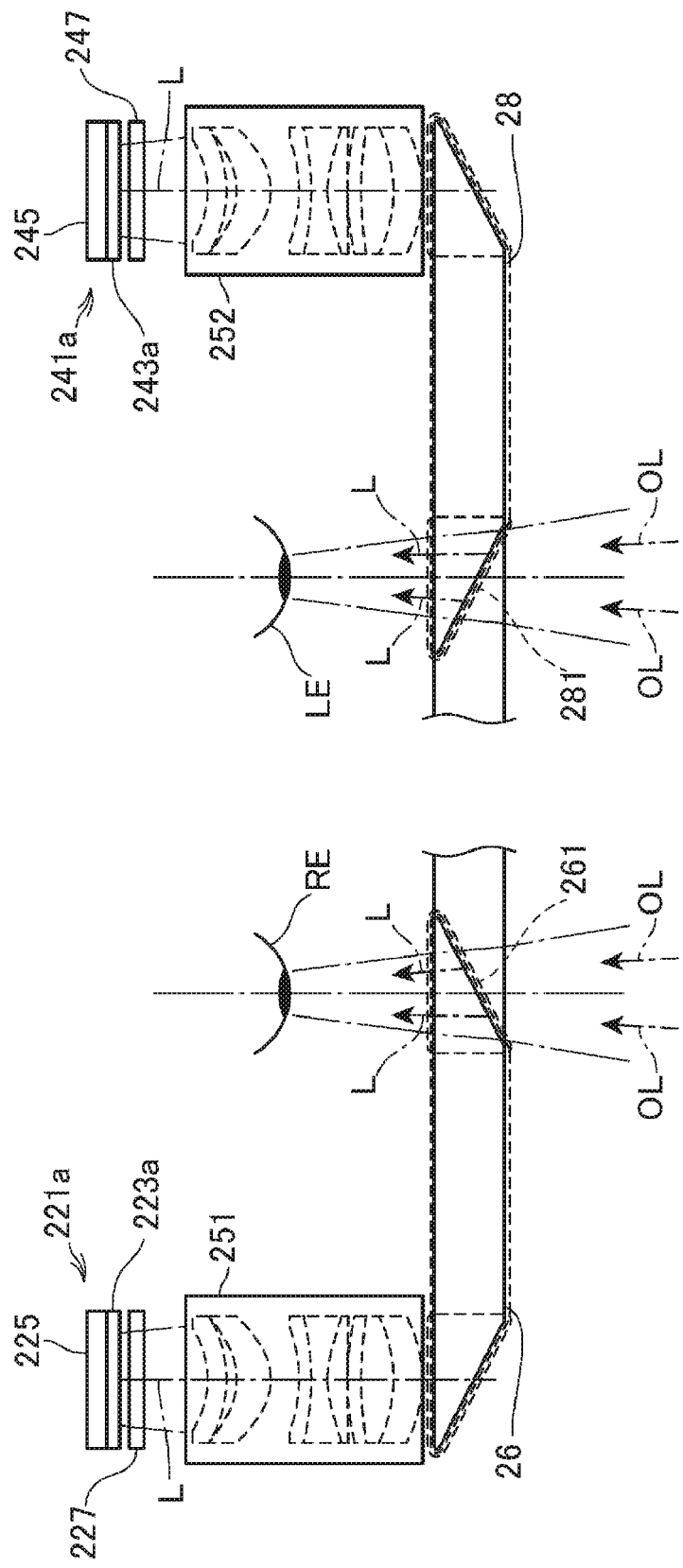
FIG. 10 is a diagram showing a configuration of an optical system in a modified example of the HMD.

The invention is not limited to this configuration, but it is also possible to adopt a configuration in which the OLED panels 223, 243 are used as backlight, and the light emitted by the backlight is modulated to thereby display an image. In other words, it is also possible to adopt a configuration in which the picture element includes the backlight and a modulation section for modulating the light emitted by the backlight to generate the picture light. FIG. 10 shows this example.

MODIFIED EXAMPLES

FIG. 10 is a diagram showing a configuration of an optical system as a modified example of the embodiment described above.

In the configuration shown in FIG. 10, an OLED unit 221*a* is disposed so as to correspond to the right eye RE of the user, and an OLED unit 241*a* is disposed so as to correspond to the left eye LE. The OLED unit 221*a* is provided with an OLED panel 223*a* for emitting white light, and the OLED drive circuit 225 for driving the OLED panel 223*a* to emit the light. Further, a modulation element 227 (a modulation device) is disposed between the OLED panel 223*a* and the right optical system 251. The modulation element 227 is formed of, for example, a transmissive liquid crystal panel, and modulates the light emitted by the OLED panel 223*a* to generate the image light L. The image light L modulated through the modulation element 227 is guided by the right light guide plate 26 to the right eye RE.

Further, the OLED unit 241*a* is provided with an OLED panel 243*a* for emitting white light, and the OLED drive circuit 245 for driving the OLED panel 243*a* to emit the light. A modulation element 247 (a modulation device) is disposed between the OLED panel 243*a* and the left optical system 252. The modulation element 247 is formed of, for example, a transmissive liquid crystal panel, and modulates the light emitted by the OLED panel 243*a* to generate the image light L. The image light L modulated through the modulation element 247 is guided by the left light guide plate 28 to the left eye LE.

The modulation elements 227, 247 are each connected to a liquid crystal driver circuit not shown. The liquid crystal driver circuit (a modulation device drive section) is mounted on a substrate (not shown) disposed in the vicinity of each of the modulation elements 227, 247, for example. Further, the temperature sensors 217, 239 can be disposed respectively on the substrates.

According to this configuration, the right display unit 22 and the left display unit 24 are formed of picture elements provided with the OLED panels 223*a*, 243*a* as light source sections, and the modulation elements 227, 247 for modulating the light emitted by the light source sections to output the image light including a plurality of colored light beams, respectively. Further, the liquid crystal driver circuits for driving the modulation elements 227, 247 are provided, and the temperature sensors 217, 239 are mounted together with the liquid crystal driver circuits. Due this configuration, in the configuration of modulating the light emitted by the light source section using the OLED panels 223*a*, 243*a* to output the image light, the changes in the temperatures of the light sources and the modulation devices can accurately be detected.

Each of the modulation devices for modulating the light emitted by the OLED panels 223*a*, 243*a* is not limited to the configuration of being formed of the transmissive liquid crystal panel, but it is possible to use a reflective liquid crystal panel, or it is also possible to use a digital micromirror device or the like.

It should be noted that the invention is not limited to the configurations of the embodiment described above and the modified example, but can be implemented in various forms within the scope or the spirit of the invention.

In the embodiment described above, the configuration for the user to visually recognize the outer scenery through the display section is not limited to the configuration in which the right light guide plate 26 and the left light guide plate 28 transmit the outside light. For example, the invention can be applied to a display device for displaying an image in a state in which the outside scenery cannot visually be recognized. Specifically, the invention can be applied to a display device for displaying the taken image of the camera 61, an image a CG generated based on the taken image, picture based on video data stored in advance or video data input from the outside, and so on. As the display device this kind, it is possible to include a so-called closed type display device in which the outside scenery cannot visually be recognized. Further, the invention can also be applied to a display device which does not perform a process such as AR display for displaying an image superimposed on the real space as explained in the embodiment described above, MR (mixed reality) display for combining the taken image in the real space and a virtual image with each other, or VR (virtual reality) display for displaying a virtual image. For example, a display device for displaying video data or analog video signal input from the outside is obviously included in the application object of the invention.

Further, for example, it is possible to adopt an image display section of a different type such as an image display section to be worn like a cap instead of the image display section 20, and it is sufficient to be provided with a display section for displaying an image so as to correspond to the left eye of the user, and a display section for displaying an image so as to correspond to the right eye of the user. Further, it is also possible for the display device according to the invention to adopt a configuration as the head mounted display installed in a mobile object such as a vehicle or a plane. Further, it is also possible to adopt a configuration as head-mounted display incorporated in a body protector such as a helmet. In this case, a part for positioning the device with respect to the body of the user and a part positioned with respect to the part can be used as the mounting sections.

Further, although in the embodiment described above, the explanation is presented citing the configuration in which the image display section 20 and the control device 10 are separated from each other, and are connected to each other via the connection cable 40 as an example, it is also possible to adopt a configuration in which the control device 10 and the image display section 20 are configured integrally to be mounted on the head of the user.

Further, a laptop computer, a tablet computer, or a desktop computer can also be used as the control device 10. Further, as the control device 10, there can be used a portable electronic apparatus including a game machine, a cellular phone, a smartphone, and a portable media player, and other dedicated equipment. Further, it is also possible to adopt a configuration in which the control device 10 is configured separately from the image display section 20, and the variety of signals are wirelessly transmitted and received bet the control device 10 and the image display section 20.

Further, as the optical system for guiding the image light to the eyes of the user, there is illustrated the configuration in which the virtual images are formed in parts of the right light guide plate 26 and the left light guide plate 28 using the half mirrors 261, 281. The invention is not limited to this configuration, but it is also possible to adopt a configuration in which the image is displayed in the entire area or in a display region having the area occupying a great part of each of the right light guide plate 26 and the left light guide plate 28. In this case, in the operation of changing the display position of the image, a process of shrinking the image can also be included.

Further, the optical elements of the invention is not limited to the right light guide plate 26 and the left light guide plate 28 respectively including the half mirrors 261, 281, but can sufficiently be the optical components for making the image light enter the eyes of the user, and specifically, a diffraction grating, a prism, and a holography display section can also be used.

Further, at least a part functional blocks shown in FIG. 4 and so on can be realized with hardware, or can be provided with a configuration realized by cooperation between hardware and software, and the invention is not limited to the configuration of arranging the independent hardware resources in the same manner as shown in the drawings. Further, a program executed by the control section 150 can be stored in the nonvolatile storage 121 or another storage device (not shown) inside the control device 10, or it is also possible to adopt a configuration of obtaining the program stored in an external device via the communication section 117 or the external connector 184 to execute the program. Further, among the constituents formed in the control device 10, the operation section 110 can also be formed as a user interface (UI). Further, the constituents formed in the control device 10 can also be formed redundantly in the image display section 20. For example, a processor similar to the main processor 140 can also be provided to the image display section 20, or it is possible to adopt a configuration in which the main processor 140 provided to the control device 10 and the processor of the image display section 20 perform respective functions separated from each other.

The entire disclosure of Japanese Patent Application No. 2015-248143, filed Dec. 21, 2015 is expressly incorporated by reference herein.

What is claimed is:

1. A display device worn by a user to use, comprising:
  a first picture element and a second picture element each generating picture light;
  a display section adapted to make a right eye of the user visually recognize an image based on the picture light generated by the first picture element, and make a left eye of the user visually recognize an image based on the picture light generated by the second picture element;
  a temperature detection section adapted to detect temperature of each of the first picture element and the second picture element; and
  a control section adapted to control luminance of the picture light generated by at least either one of the first picture element and the second picture element based on the temperature detected by the temperature detection section.

2. The display device according to claim 1, wherein
the control section performs control of conforming the luminance of the picture light generated by the first picture element and the luminance of the picture light generated by the second picture element to lower one of the luminance of the picture light generated by the first picture element and the luminance of the picture light generated by the second picture element based on the temperatures of the first picture element and the second picture element.

3. The display device according to claim 2, wherein
the control section performs control of conforming the luminance of the picture light generated by the first picture element and the luminance of the picture light generated by the second picture element to lower one of the luminance of the picture light generated by the first picture element and the luminance of the picture light generated by the second picture element in a case in which either one of the temperatures of the first picture element and the second picture element becomes one of equal to and higher than a threshold value.

4. The display device according to claim 2, wherein
the control section performs control of conforming the luminance of the picture light generated by the first picture element and the luminance of the picture light generated by the second picture element to luminance corresponding to illuminance of outside light of the display section based on the temperatures of the first picture element and the second picture element.

5. The display device according to claim 4, wherein
the display section has a configuration of making the user visually recognize the image based on the picture light generated by the first picture element and the image based on the picture light generated by the second picture element, and transmitting an outside scenery to make the user visually recognize the outside scenery, and
the control section performs control of conforming the luminance of the picture light generated by the first picture element and the luminance of the picture light generated by the second picture element to the luminance corresponding to the illuminance of the outside light transmitted through the display section.

6. The display device according to claim 1, wherein
the display section is provided with an optical section adapted to guide the picture light generated by the first picture element to the right eye of the user and guide the picture light generated by the second picture element to the left eye of the user.

7. The display device according to claim 1, wherein
the first picture element and the second picture element are respectively located on sides of a head of the user.

8. The display device according to claim 7, wherein
the control section performs control of decreasing the luminance of the picture light generated by at least either one of the first picture element and the second picture element in a case in which at least either one of the temperatures of the first picture element and the second picture element becomes one of equal to and higher than a threshold value determined based on an influence on a body of the user.

9. The display device according to claim 1, wherein
the first picture element and the second picture element are each provided with a panel on which a light emitting member is mounted, and
the temperature detection section is disposed on a back side of the light emitting member so as to have contact with the panel.

10. The display device according to claim 9, wherein
the first picture element and the second picture element are each provided with the panel adapted to output image light including a plurality of colored light beams and a drive section adapted to drive the panel, and
the temperature detection section is mounted on the drive section to detect temperature of the panel.

11. The display device according to claim 10, further comprising:
a storage section adapted to store a correction parameter used to correct a gamma value of the image light emitted by the panel for each temperature value of the panel,
wherein the control section controls the luminance of the picture light generated by at least either one of the first picture element and the second picture element based on the temperature detected by the temperature detection section, and performs gamma correction of the panel using the correction parameter corresponding to the temperature detected by the temperature detection section.

12. The display device according to claim 1, wherein
the first picture element and the second picture element are each provided with a light source section, a modulation device adapted to modulate light emitted by the light source section to output image light including a plurality of colored light beams, and a modulation device drive section adapted to drive the modulation device, and
the temperature detection section is mounted together with the modulation device drive section.

13. A method of controlling a display device, comprising:
providing the display device worn by a user to use and including a first picture element and a second picture element each generating picture light, and a display section adapted to make a right eye of the user visually recognize an image based on the picture light generated by the first picture element, and make a left eye of the user visually recognize an image based on the picture light generated by the second picture element;
detecting temperature of each of the first picture element and the second picture element; and
controlling luminance of the picture light generated by at least either one of the first picture element and the second picture element based on the temperature detected.

14. A display device worn by a user to use, comprising:
a first picture element generating a first picture light;
a display section adapted to make an eye of the user visually recognize an image based on the first picture light;
a first temperature detection section adapted to detect a first temperature of the first picture element; and
a control section adapted to control luminance of the first picture light based on the first temperature detected by the first temperature section,
wherein the display device is a head-mounted display device.

15. The display device according to claim 14, further comprising:
a second picture element generating a second picture light; and
a second temperature detection section adapted to detect a second temperature of the second picture element,
wherein a display section is adapted to make another eye of the user visually recognize an image based on the second picture light generated by the second picture element, and
the control section is adapted to control luminance of the second picture light generated by the second picture element based on the second temperature detected by the second temperature detection section.

* * * * *